US010826249B2

(12) United States Patent
Utsunomiya et al.

(10) Patent No.: US 10,826,249 B2
(45) Date of Patent: Nov. 3, 2020

(54) ROTARY CONNECTOR APPARATUS

(71) Applicants: FURUKAWA ELECTRIC CO., LTD., Tokyo (JP); FURUKAWA AUTOMOTIVE SYSTEMS INC., Shiga (JP)

(72) Inventors: Hirofumi Utsunomiya, Shiga (JP); Kenji Hiroki, Shiga (JP); Masashi Kanazawa, Shiga (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 0 days.

(21) Appl. No.: 16/225,425

(22) Filed: Dec. 19, 2018

(65) Prior Publication Data
US 2019/0131749 A1 May 2, 2019

Related U.S. Application Data

(63) Continuation of application No. PCT/JP2017/022260, filed on Jun. 16, 2017.

(30) Foreign Application Priority Data

Jun. 21, 2016 (JP) .................................. 2016-122759

(51) Int. Cl.
*H01R 13/696* (2011.01)
*H01R 13/688* (2011.01)
(Continued)

(52) U.S. Cl.
CPC ......... *H01R 13/696* (2013.01); *H01R 13/688* (2013.01); *H01R 35/025* (2013.01);
(Continued)

(58) Field of Classification Search
CPC ... H01R 13/696; H01R 13/688; H01R 35/025
(Continued)

(56) References Cited

U.S. PATENT DOCUMENTS 5,227,955 A * 7/1993 Le Bris ............... B60R 16/0238
174/541
5,683,259 A * 11/1997 Sato ...................... B60R 16/027
439/164

(Continued)

FOREIGN PATENT DOCUMENTS

CN 1578018 A 2/2005
CN 204947295 U 1/2016
(Continued)

OTHER PUBLICATIONS

European Search Report dated Jan. 27, 2020, in a counterpart European patent application No. 17815288.0.
(Continued)

*Primary Examiner* — Alexander Gilman
(74) *Attorney, Agent, or Firm* — Chen Yoshimura LLP

(57) ABSTRACT

A rotary connector apparatus includes: a ring-shaped fixed member; a ring-shaped rotating member rotatably fitted to the fixed member; a flexible flat cable housed in a housing space formed by the fixed member and the rotating member, the flexible flat cable having a plurality of wires, one end of the flexible flat cable being fixed to the fixed member and another end thereof being fixed to the rotating member, wherein a first connector housing attached to the fixed member accommodates a plurality of electrically conductive paths that respectively connect a plurality of first terminals to the plurality of wires at said one end of the flexible flat cable, and at least one of the plurality of electrically conductive paths is configured to removably receive a protection device so as to protect the path from overcurrent.

16 Claims, 11 Drawing Sheets

(51) Int. Cl.
  *H01R 35/04* (2006.01)
  *H01R 35/02* (2006.01)
  *H02H 9/02* (2006.01)
(52) U.S. Cl.
  CPC ............. *H01R 35/04* (2013.01); *H02H 9/026* (2013.01); *H01R 2201/26* (2013.01)
(58) Field of Classification Search
  USPC ................................................... 439/620.26
  See application file for complete search history.

(56) References Cited

U.S. PATENT DOCUMENTS

| | | | | |
|---|---|---|---|---|
| 5,762,507 | A * | 6/1998 | Mochizuki | H01R 35/025 439/15 |
| 6,007,355 | A * | 12/1999 | Shibata | B60R 16/027 439/15 |
| 6,299,466 | B1 * | 10/2001 | Bolen | B60R 16/027 439/164 |
| 6,435,885 | B2 * | 8/2002 | Araki | H01R 35/025 439/164 |
| 6,641,415 | B2 * | 11/2003 | Maegawa | H01R 35/025 439/15 |
| 6,736,645 | B2 * | 5/2004 | Kato | B60R 16/027 439/15 |
| 6,962,497 | B2 * | 11/2005 | Wade | B60R 16/027 439/15 |
| 7,203,070 | B2 * | 4/2007 | Weisz-Margulescu | H01R 13/5213 174/520 |
| 7,232,312 | B2 | 6/2007 | Wade et al. | |
| 9,472,914 | B2 * | 10/2016 | Takahashi | B60R 16/027 |
| 9,960,545 | B2 * | 5/2018 | Golubovic | H01R 24/60 |
| 10,333,294 | B2 * | 6/2019 | Golubovic | H02H 7/226 |
| 10,574,011 | B2 * | 2/2020 | Tanaka | H01R 35/025 |
| 2003/0017745 | A1 * | 1/2003 | Maegawa | H01R 13/68 439/620.26 |
| 2004/0209504 | A1 | 10/2004 | Wade et al. | |
| 2004/0209505 | A1 | 10/2004 | Wade et al. | |
| 2016/0006203 | A1 | 1/2016 | Takahashi et al. | |

FOREIGN PATENT DOCUMENTS

| | | |
|---|---|---|
| CN | 105322399 A | 2/2016 |
| CN | 105375222 A | 3/2016 |
| EP | 2 963 742 A1 | 1/2016 |
| JP | S55-77381 U | 5/1980 |
| JP | H10-92541 A | 4/1998 |
| JP | 2002-216923 A | 8/2002 |
| JP | 2003-32871 A | 1/2003 |
| JP | 2006-107809 A | 4/2006 |
| JP | 2013-191437 A | 9/2013 |
| JP | 2016-018591 A | 2/2016 |
| KR | 100654715 B1 | 11/2006 |

OTHER PUBLICATIONS

Chinese Office Action dated Nov. 21, 2019, in a counterpart Chinese patent application No. 201780037553.6. (A machine translation (not reviewed for accuracy) attached.).

Korean Office Action dated Nov. 12, 2019, in a counterpart Korean patent application No. 10-2018-7037452. (A machine translation (not reviewed for accuracy) attached.).

English translation of Written Opinion (PCT/ISA/237) issued in PCT/JP2017/022260 dated Sep. 2017.

Japanese Office Action dated Dec. 17, 2019, in a counterpart Japanese patent application No. 2016-122759. (A machine translation (not reviewed for accuracy) attached.).

International Search Report (ISR) issued in PCT/JP2017/022260 dated Sep. 2017.

Written Opinion (PCT/ISA/237) issued in PCT/JP2017/022260 dated Sep. 2017. (Concise Explanation of Relevance: This Written Opinion considers that the claims are described by or obvious over the Foreign Patent Document Nos. 1-4 cited in the ISR above.).

* cited by examiner

ROTARY CONNECTOR APPARATUS

BACKGROUND OF THE INVENTION

Technical Field

The present invention relates to a rotary connector apparatus to be installed in a vehicle such as an automobile, for example, and more particularly to a rotary connector apparatus including a connection connector-equipped flat cable having a connection connector arranged on an end thereof.

Background Art

Rotary connector apparatuses to be installed in vehicles such as automobiles, for example, include a rotating member and a fixed member configured so as to be rotatable relative to one another, and house a flexible flat cable (hereinafter, "flat cable") wound inside a ring-shaped housing space formed between the rotating member and the fixed member.

Connection connectors are provided on both ends of the flat cable housed inside the rotary connector apparatus, and these connection connectors are respectively housed inside a rotating member-side connection connector housing formed in the rotating member and a fixed member-side connection connector housing formed in the fixed member. These connection connectors are electrically connected to conductors of external electronic devices (hereinafter, "external conductors of external devices").

Moreover, the connection connectors provided on both ends of the flat cable typically each include busbars having connection terminals to be connected to external conductor terminals, as well as a holder which supports the busbars.

As a result of continued design diversification in recent years, various types of external devices such as illumination LEDs are now electrically connected together via such rotary connector apparatuses. However, inflow of extremely large currents (hereinafter, overcurrent) resulting from external noise or the like, for example, can potentially damage LED circuits, flat cable, and the like.

To address this problem, Patent Document 1 discloses a rotary connector apparatus in which a connection component (protection device) such as a fuse is connected between connection connectors and external conductors in order to prevent inflow of overcurrent to LED circuits or a flat cable or the like, thereby preventing damage to the electrical circuit.

In the rotary connector apparatus disclosed in Patent Document 1, the flat cable conductor and the external conductor are electrically connected together via a fuse, and inflow of overcurrent to the flat cable causes this connection component (protection device) to break, thereby interrupting the flow of current between the flat cable and the external conductor and making it possible to prevent damage to the electrical circuit.

However, because this connection component is fixed to the busbars arranged between the conductor and the external conductor, it is extremely difficult to replace the connection component in cases such as when the connection component does break and interrupt the flow of current, for example.

RELATED ART DOCUMENTS

Patent Document

Patent Document 1: Japanese Patent Application Laid-Open Publication No. H10-92541

SUMMARY OF THE INVENTION

In light of the foregoing problems, the present invention aims to provide a rotary connector apparatus including a connection connector-equipped flat cable, which makes it possible to prevent electrical circuit damage resulting from inflow of overcurrent and which also makes it possible to easily replace a connection component (protection device).

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a rotary connector apparatus, including: a ring-shaped fixed member; a ring-shaped rotating member rotatably fitted to the fixed member; a flexible flat cable housed in a housing space formed by the fixed member and the rotating member, the flexible flat cable having a plurality of wires, one end of the flexible flat cable being fixed to the fixed member and another end thereof being fixed to the rotating member; a first connector housing attached to the fixed member, the first connector housing having a plurality of first terminals that are to be connected to an external plug or jack, the plurality of first terminals being electrically connected to the plurality of wires, respectively, through an interior of the first connector housing at said one end of the fixable flat cable; and a second connector housing attached to the rotating member, the second connector housing having a plurality of second terminals that are to be connected to another external plug or jack, the plurality of second terminals being respectively electrically connected to the plurality of wires, respectively, through an interior of the second connector housing at said another end of the fixable flat cable, wherein the first connector housing accommodates a plurality of electrically conductive paths that respectively connect the plurality of first terminals to the plurality of wires at said one end of the flexible flat cable, and at least one of the plurality of electrically conductive paths is configured to removably receive a protection device so as to protect the path from overcurrent.

Here, the first and second connector housings each may be a connector receptacle that is configured to receive an external connector plug or a connector plug that is configured to be inserted into an external connector jack.

Also, the first connector housing may be integrally formed with the fixed member, and the second connector housing may be integrally formed with the rotating member.

Another aspect of the present invention is a rotary connector apparatus, including: a ring-shaped fixed member; a ring-shaped rotating member rotatably fitted to the fixed member; a conductor housed in a housing space formed by the fixed member and the rotating member; and a connection connector having a busbar connected to an end of the conductor, wherein a connection component (protection device) that is to be installed into and to be removed from the connection connector is provided. The busbar includes: a connection terminal portion to be connected to another terminal; a conductor connection portion that is electrically connected to the conductor; and a component installation portion (protection device holder) into which the connection component that electrically connects the connection terminal portion and the conductor connection portion is removably installed.

The "other terminal" described above refers to a connection terminal connected to a conductor of an external device to be electrically connected via the rotary connector apparatus.

The connection component (protection device) can be a fuse that breaks when overcurrent flows in; a circuit protection component such as a resistor, diode, or thermistor for protecting an electrical circuit; or a conductive component that simply passes current flowing through the conductor into the other terminal as-is, for example.

According to this aspect, damage to an electrical circuit due to inflow of overcurrent can be prevented and the connection component (protection device) can be replaced easily. Here, "replacing the connection component" includes both replacing the connection component installed into the component installation portion with another connection component of the same type as well as replacing with a connection component of a different type.

More specifically, the component installation portion that makes it possible to removably install the connection component that electrically connects together the connection terminal portion and the conductor connection portion is provided on the busbar. This makes it possible to easily remove the connection component (such as a fuse that breaks and interrupts the flow of current when an overcurrent flows in, for example) from the connection connector and also makes it possible to easily replace the connection component with a new connection component.

Moreover, the connection component can be replaced with a connection component suitable for the external device based on the design or the like of the external device, for example, thereby making it possible to reliably prevent damage to the electrical circuit, making it possible to standardize the conductor and the connection connector and the like, and also making it possible to reduce the number of components.

In other words, providing on the busbar the component installation portion into which the connection component is removably installed makes it possible to reliably prevent damage to the electrical circuit and also makes it possible to easily replace the connection component when replacement is necessary. This, in turn, makes it possible to improve the maintainability of the rotary connector apparatus.

One aspect of the present invention may further include a connector housing that houses the connection connector and connected to the housing space, wherein a through-window through which the connection component can be inserted is formed in a facing portion on an outer side of the connector housing that faces the component installation portion.

According to this aspect, the connection component can be easily replaced from the outside via the through-window without having to remove the connection connector from the rotary connector apparatus, and thus the maintainability of the rotary connector apparatus can be further improved.

In another aspect of this invention, the through-window may be formed in a surface that runs in a direction of an axis of rotation of the rotating member.

According to this aspect, the connection component can be replaced more easily.

More specifically, the through-window is formed in a surface that runs in the direction of the axis of rotation of the rotating member; in other words, the through-window is formed in the side of the rotary connector apparatus as arranged with the rotating member on the upper side. This facilitates easy access to the connection component via the through-window and makes it possible to easily replace the connection component.

Moreover, forming the through-window in the side of the rotary connector apparatus makes it possible to reduce infiltration of foreign materials such as dust into the rotary connector apparatus in comparison to if the through-window was formed in the top.

This improves the efficiency of replacing the connection component, makes it possible to further improve the maintainability of the rotary connector apparatus, and also makes it possible to inhibit infiltration of foreign materials into the rotary connector apparatus.

Another aspect of the present invention may further include a cover member that covers the through-window.

This cover member can be configured to be part of the rotary connector apparatus, can be configured as a separate member, or can be configured to be assembled together with the connection component, for example.

This invention makes it possible to cover the through-window using the cover member, thereby making it possible to prevent foreign materials such as dust or small rocks from infiltrating into the rotary connector apparatus via the through-window, and also making it possible to prevent physical damage caused by interference of such foreign materials with the conductor housed inside the rotary connector apparatus as well as to prevent occurrence of abnormal noises caused by interference between such foreign materials and the interior of the rotary connector apparatus.

In another aspect of the present invention, the busbar may further include a conductivity inspection portion to which a conductivity inspection device is to be connected to test conductivity of the connection component, the conductivity inspection portion being formed further on a side of the conductor connection portion of the busbar relative to the component installation portion.

According to this aspect, by connecting the conductivity inspection device to the connection terminal portion and to the conductivity inspection portion, the conductivity of the connection component that electrically connects the connection terminal portion and conductivity inspection portion of the busbar can be tested in a condition that the connection component is installed into the component installation portion.

Moreover, because the conductivity inspection portion is formed further on the side of the conductor connection portion of the busbar than the component installation portion, the conductivity inspection portion and the conductor connected to the conductor connection portion are electrically connected and form an electrical circuit, thereby making it possible to connect the conductivity inspection device to the conductivity inspection portion to also test the conductivity of the conductor. In other words, this makes it possible to also test for damage to the conductor.

Another aspect of the present invention may further include a conductivity inspection window through which the conductivity inspection device can be inserted, the conductivity inspection window being formed in a facing portion of an outer surface of the connector housing that faces the conductivity inspection portion.

According to this aspect, an electrical circuit can be formed by connecting the conductivity inspection device to the conductivity inspection portion from the outside via the conductivity inspection window formed in the connector housing, thereby making it possible to test the conductivity of the connection component and the conductor. This makes it possible to test the conductivity of the connection component and the conductor without having to remove the connection connector from the rotary connector apparatus and thereby makes it possible to improve the maintainability of the rotary connector apparatus.

In another aspect of the present invention, the through-window and the conductivity inspection window may be formed integrally.

According to this aspect, the conductivity of the connection component can be tested and the connection component can be replaced from the outside via the through-window. In other words, this makes it possible to replace the connection component on the basis of the results of the conductivity test performed on the connection component, thereby making it possible to improve the efficiency of replacing the connection component and further improving maintainability.

In addition, in comparison to forming the through-window and the conductivity inspection window separately, forming these openings integrally makes it possible to prevent decreases in the strength of the connector housing and also makes it possible to reduce infiltration routes for foreign materials such as dust, thereby making it possible to inhibit infiltration of such foreign materials.

In one aspect of the present invention, the connection component may be selected from among any of resistive element-equipped electronic components, conductive components capable of carrying current, and fuses.

This invention makes it possible to select and install a connection component appropriate for the intended use case, thereby making it possible to easily prepare rotary connector apparatuses compatible with various different vehicle types or designs. Moreover, when working with an external device that does not require a circuit protection component such as a fuse or a resistor to be included, for example, a conductive component that simply passes current between the connection terminal portion and the conductor connection portion as-is can be selected. This makes it possible to improve the general-purpose versatility of the rotary connector apparatus.

In another aspect of the present invention, the component installation portion may include installation terminals respectively formed on a side of the connection terminal portion and on a side of the conductor connection portion, wherein at least one of the installation terminals is an elastic structure.

According to this aspect, the efficiency of replacing the connection component can be improved, thereby making it possible to easily and reliably install the connection component into the installation terminals in order to electrically connect the conductor and the external conductor.

The present invention makes it possible to provide a rotary connector apparatus including a connection connector-equipped flat cable, which makes it possible to prevent electrical circuit damage resulting from inflow of overcurrent and which also makes it possible to easily replace a connection component.

It is to be understood that both the foregoing general description and the following detailed description are exemplary and explanatory, and are intended to provide further explanation of the invention as claimed.

DETAILED DESCRIPTION OF EMBODIMENTS

Embodiment 1

Next, a rotary connector apparatus 1 will be described with reference to FIGS. 1 to 7.

Figure 1A:
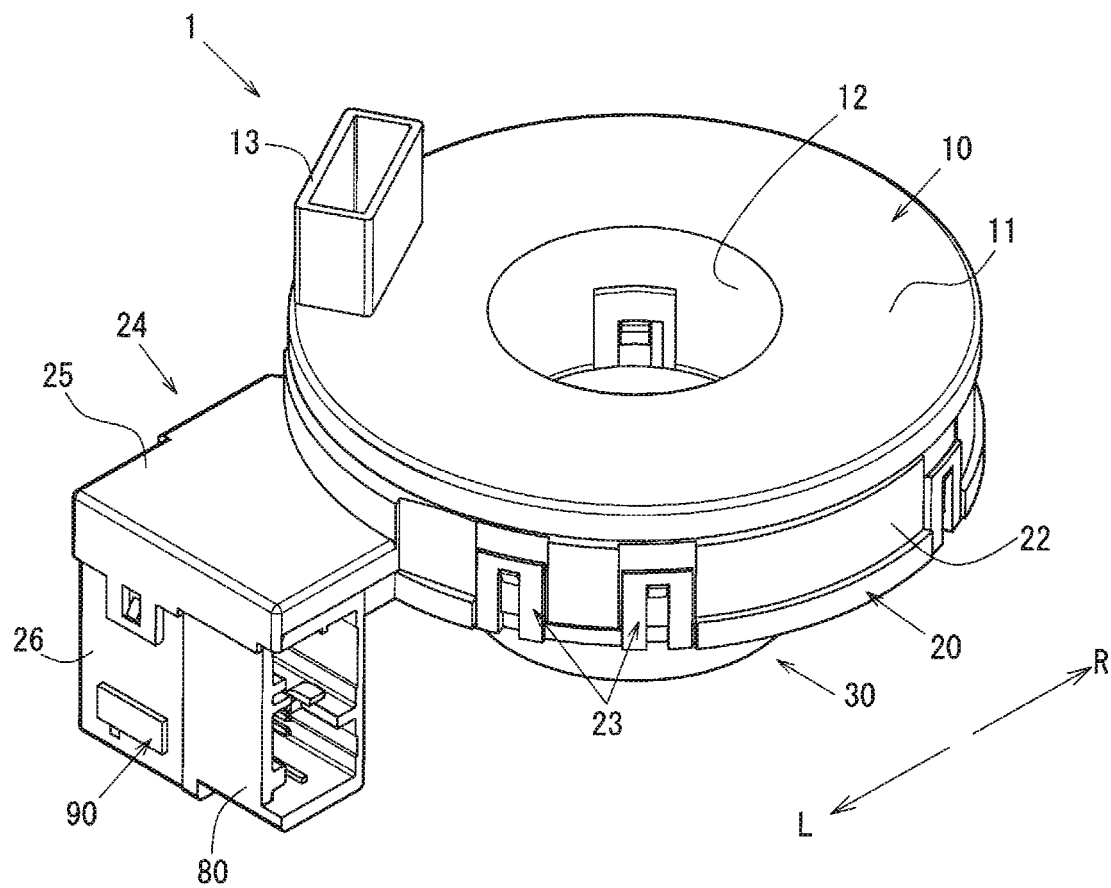
FIG. 1A is a perspective view schematically illustrating a rotary connector apparatus of Embodiment 1 of the present invention.
Figures 1B, 1C:
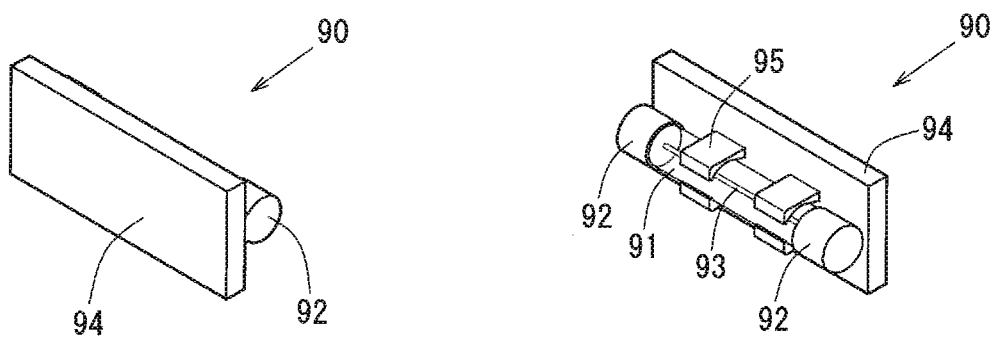
FIGS. 1B and 1C are enlarged perspective views each schematically illustrating a fuse to be installed in the rotary connector apparatus illustrated in FIG. 1A.

FIGS. 1A to 1C are perspective views schematically illustrating the rotary connector apparatus 1 and a fuse 90. More specifically, FIG. 1A is a perspective view schematically illustrating the rotary connector apparatus 1, and FIGS. 1B and 1C are enlarged perspective views schematically illustrating the fuse 90 (to be installed in a connection connector 50) as viewed from the upper right and upper left directions, respectively. Note that in the present embodiment, the side on which a rotator 10 is arranged relative to a stator 20 is the up direction, and the side on which a sleeve 30 is arranged is the down direction. Moreover, in FIGS. 1A through 1C, the near right side is the front direction and the far left side is the rear direction, while the near left side is the left direction L and the far right side is the right direction R.

Figure 2:
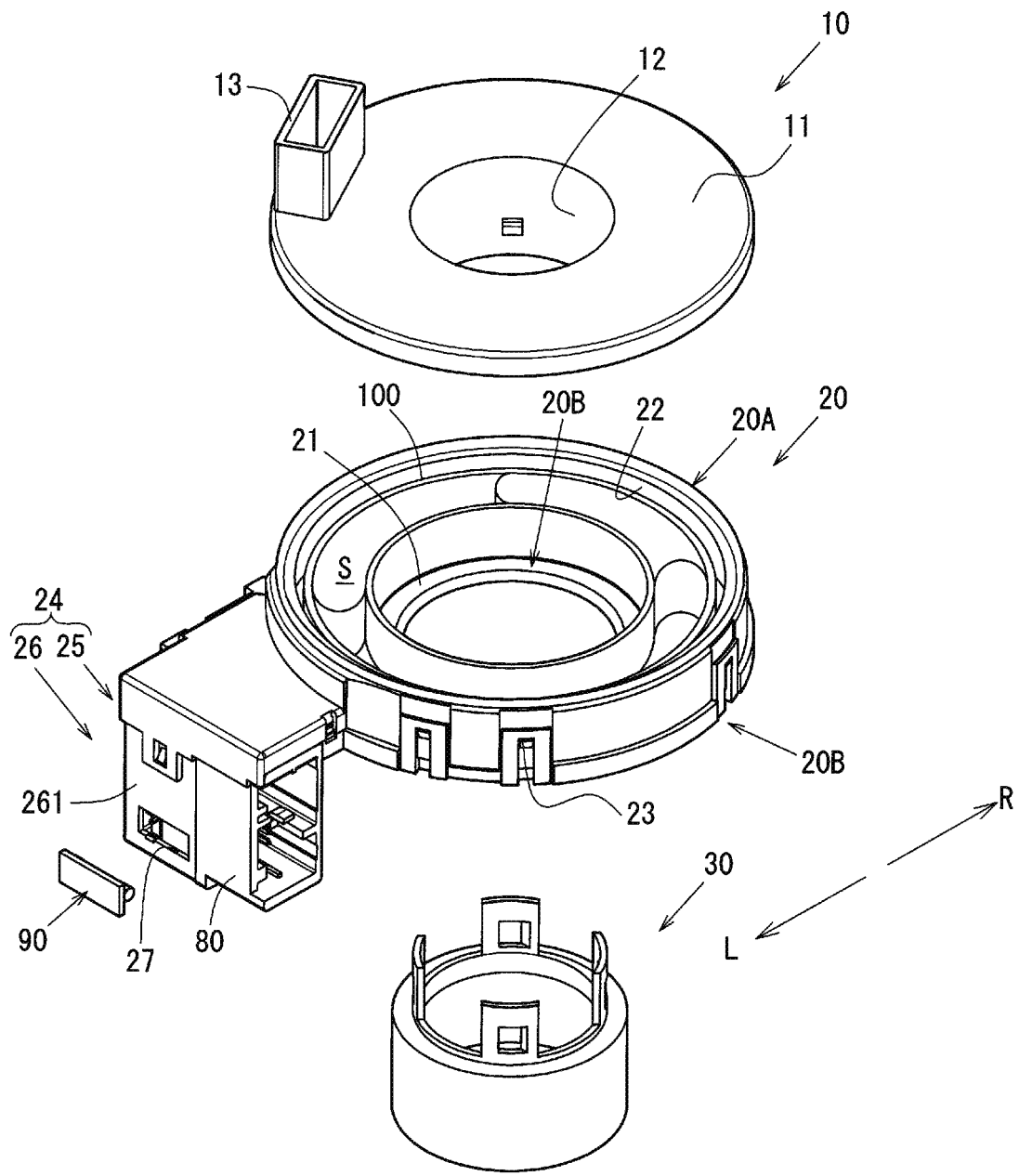
FIG. 2 is an exploded perspective view schematically illustrating the rotary connector apparatus.
Figure 3:
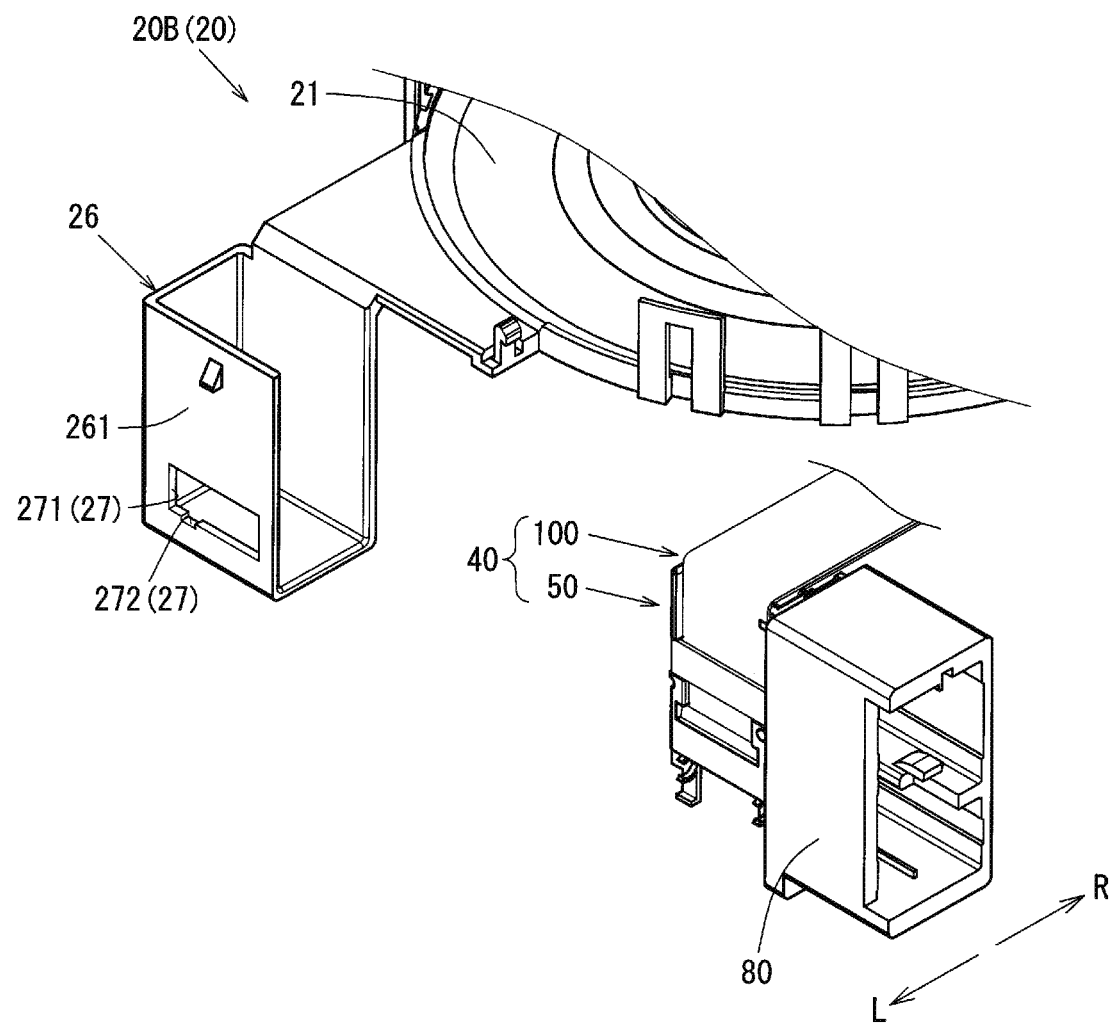
FIG. 3 is an enlarged exploded perspective view of a connector housing body and a connection connector-equipped flat cable.

FIG. 2 is an exploded perspective view schematically illustrating the rotary connector apparatus 1, FIG. 3 is an enlarged exploded perspective view of a connector housing body 26 and a connection connector-equipped flat cable 40, and FIGS. 4A to 4D are explanatory drawings of the connection connector 50 and busbars 70.

Note that in FIG. 3, the portion of a stator body 20B (stator 20) on the right direction R side is partially omitted in order to better show the connector housing body 26.

Figure 4A:
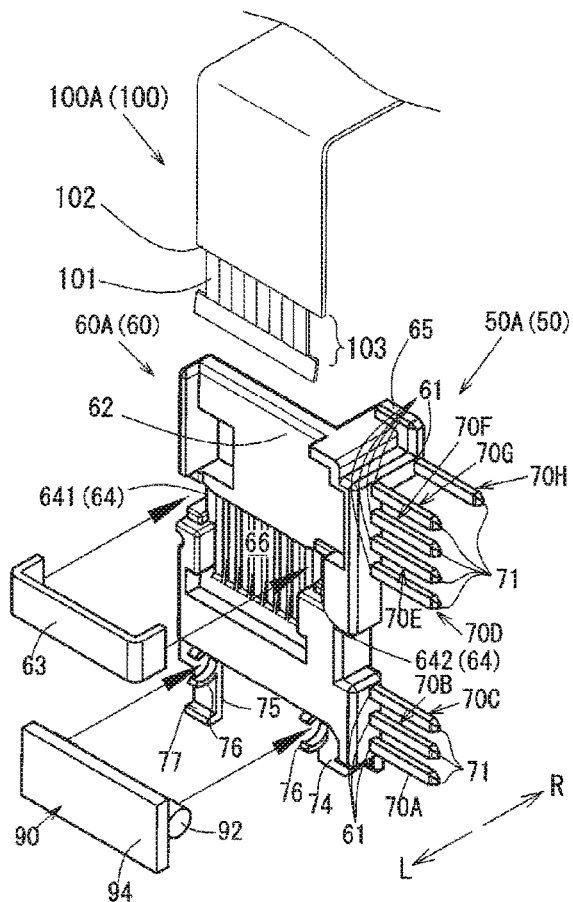
FIG. 4A is an explanatory perspective view of a connection connector.
Figure 4C:
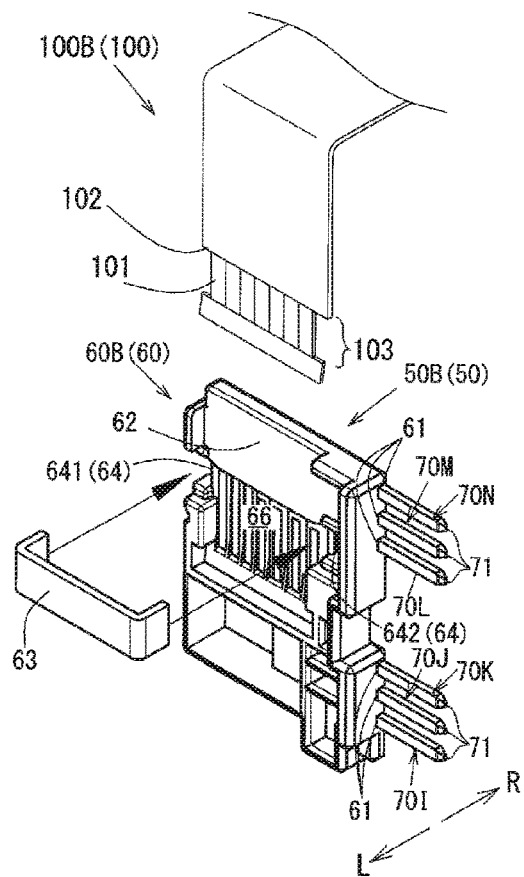
FIG. 4C is an explanatory perspective view of another connection connector.
Figure 4B:
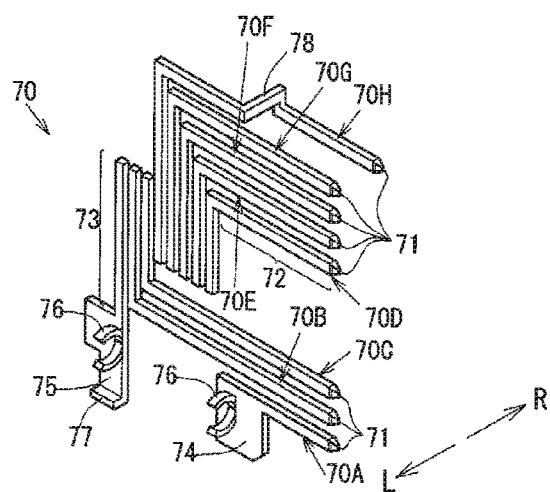
FIG. 4B is an explanatory perspective view of busbars of the connection connector illustrated in FIG. 4A.
Figure 4D:
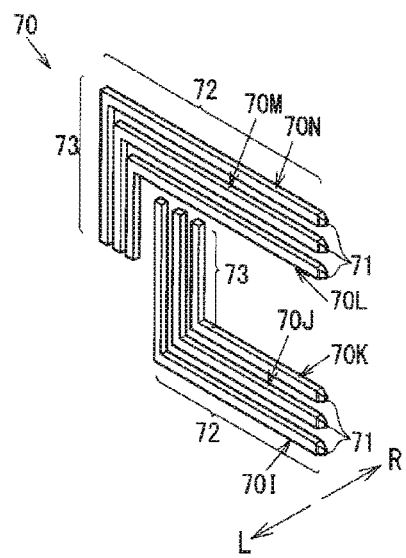
FIG. 4D is an explanatory perspective view of busbars of the connection connector illustrated in FIG. 4C.

FIG. 4A is a perspective view schematically illustrating a connection connector 50A in which the fuse 90 is installed, FIG. 4B is a perspective view schematically illustrating busbars 70 of the connection connector 50A, FIG. 4C is a perspective view schematically illustrating a connection connector 50B housed overlaid with the connection connector 50A inside a housing case 80, and FIG. 4D is a perspective view schematically illustrating busbars 70 of the connection connector 50B.

Figure 5:
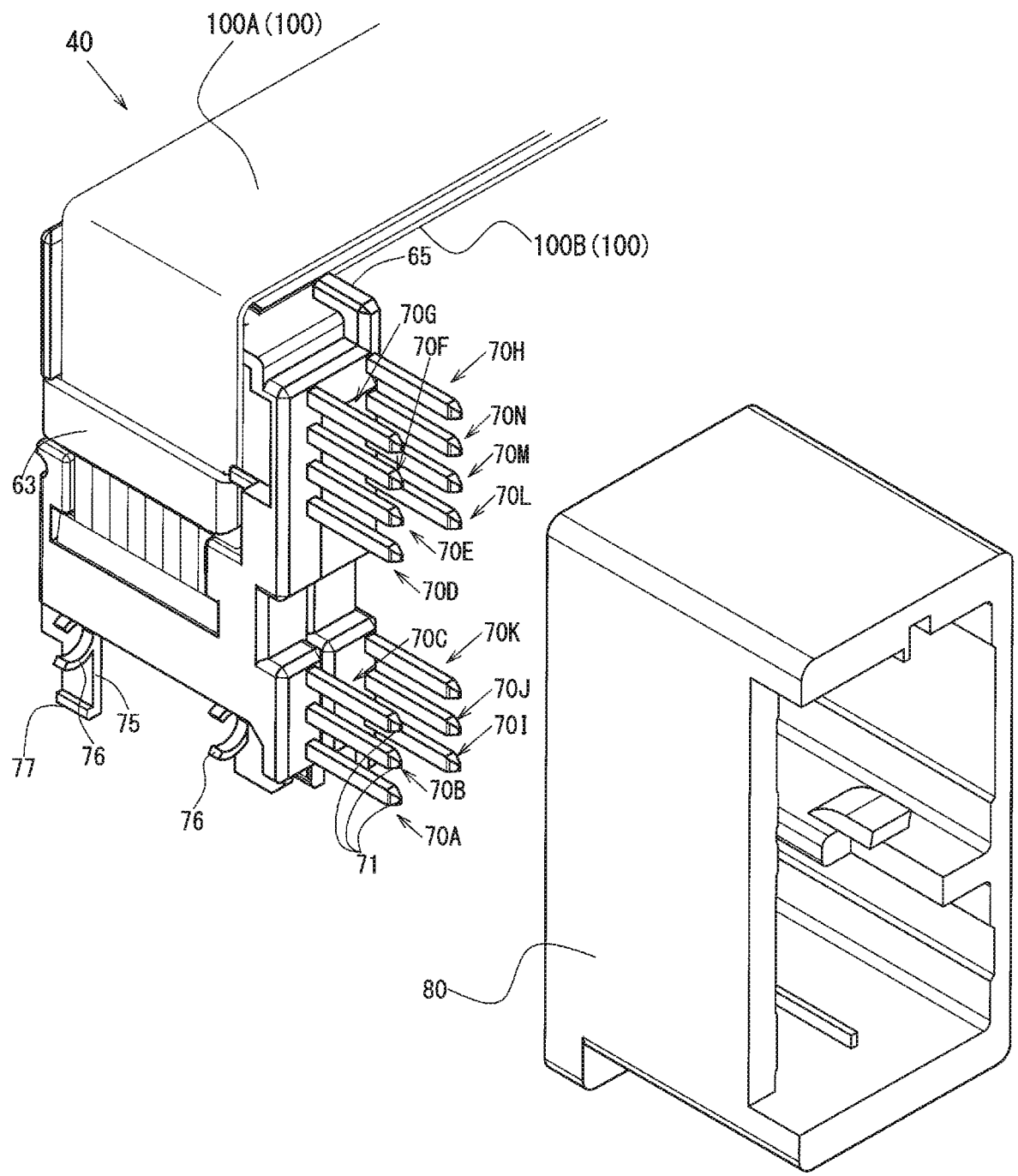
FIG. 5 is a perspective view schematically illustrating the connection connector-equipped flat cable and a housing case.
Figure 6:
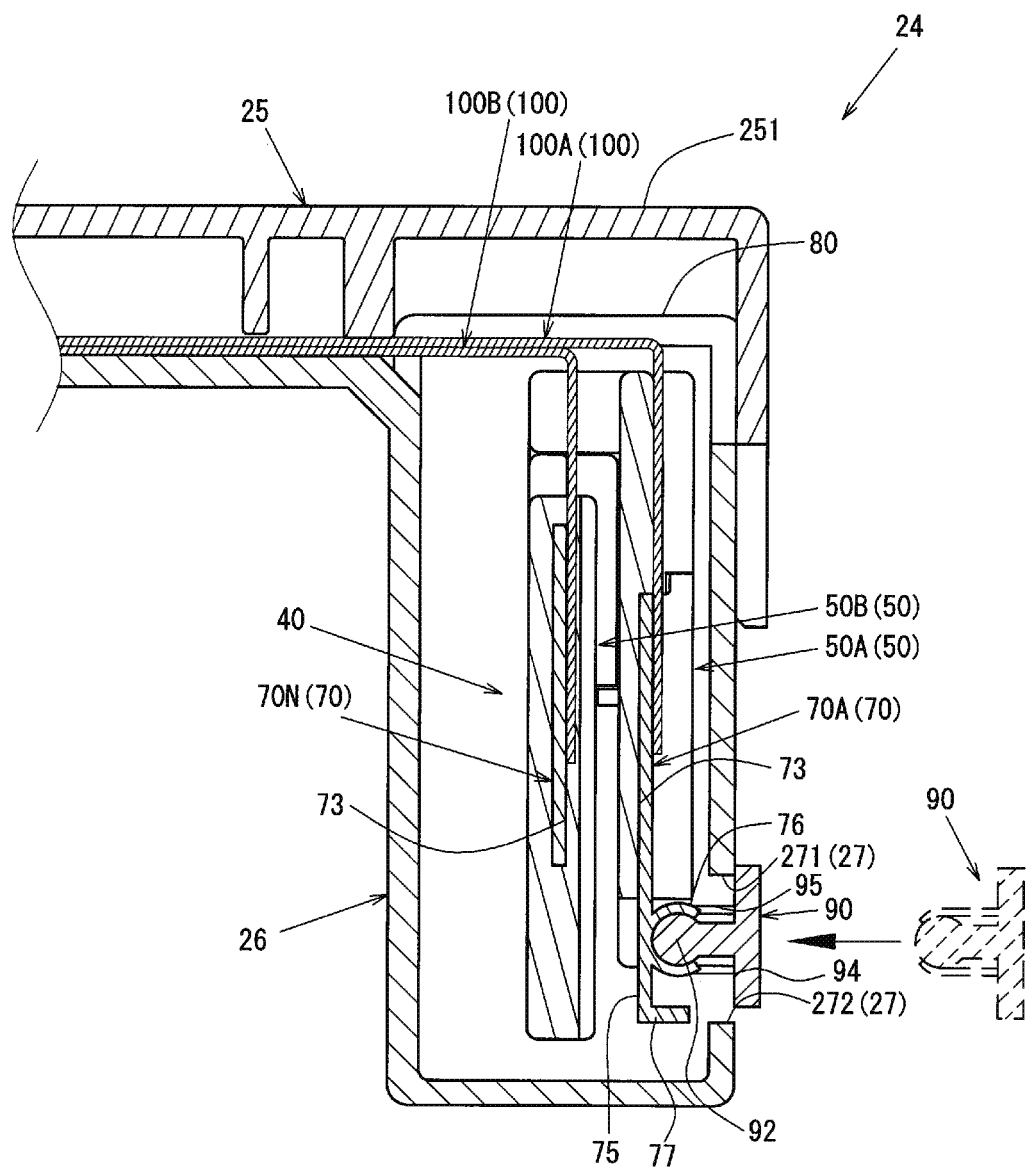
FIG. 6 is a cross-sectional view of a connector housing.

FIG. 5 is an exploded perspective view schematically illustrating the connection connector-equipped flat cable 40 and the housing case 80, and FIG. 6 is a cross-sectional view schematically illustrating the connector housing body 26 in a state in which the fuse 90 is installed in the connection connector 50A. More specifically, FIG. 6 is a cross-sectional view illustrating, as viewed from the rear direction, a cross-section of the connector housing body 26 taken running through a conductor connection portion 73 connected to a busbar 70A.

Figure 7:
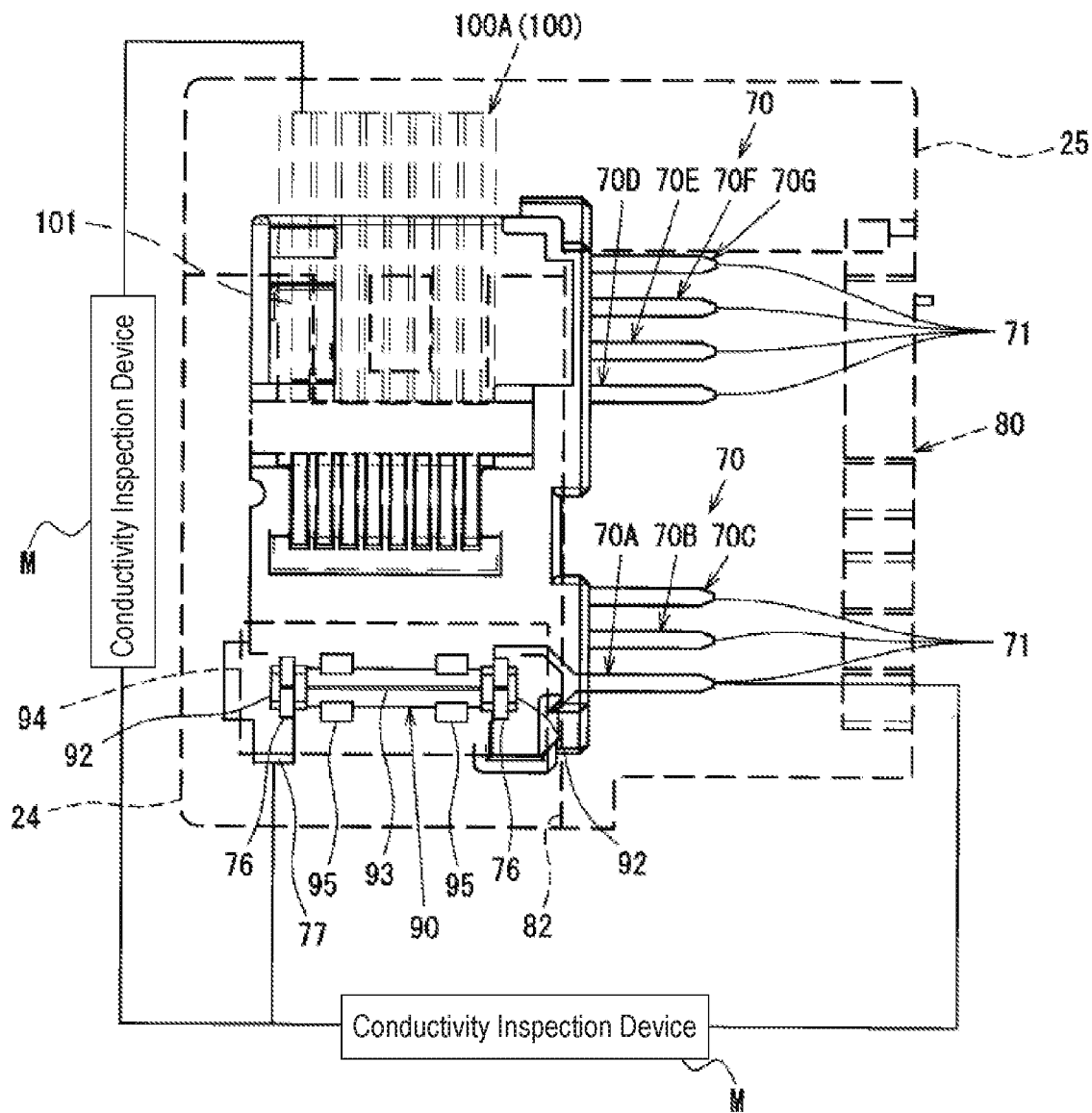
FIG. 7 is a side view of the connection connector.

FIG. 7 is a left side view illustrating the connection connector 50 as housed inside the connector housing body 26. More specifically, FIG. 7 is a side view illustrating, as viewed from the left direction, a state in which the fuse 90 is installed in the connector housing body 26 housing the connection connector-equipped flat cable 40. Note that in FIG. 7, the connector housing body 26, the housing case 80, and a flat cable 100 are illustrated in dashed lines in order to make the connection connector 50A and the fuse 90 easier to see.

As illustrated in FIG. 1A, the rotary connector apparatus 1 is a substantially cylindrical apparatus including a rotator 10, a stator 20 positioned below the rotator 10, and a sleeve 30 configured such that the rotator 10 and the stator 20 can rotate relative to one another. Moreover, a stator-side connector housing (first connector housing) 24 is formed on the left direction L side to accommodate a plurality of terminals that are to be connected to external plug or jack.

The stator-side connector housing 24 includes a connector housing body 26 which houses a connection connector 50 attached to one end of a flat cable 100 (hereinafter, "FFC 100") housed within a housing space S formed between the assembled rotator 10 and stator 20, thereby allowing a fuse 90 to be installed in the housed connection connector 50 from the outer side of the connector housing body 26.

First, the fuse 90 will be described.

As illustrated in FIG. 1B and FIG. 1C, the fuse 90 is a cylinder-shaped circuit protection component and includes a glass cover 91 made of glass and having a hollow cylindrical shape, metal contact points 92 made of metal and mounted on both ends of the glass cover 91, and an element 93 running through the glass cover 91 and connecting together the metal contact points 92 mounted on both ends of the glass cover 91. Moreover, the fuse 90 is held in place by a through-window cover 94.

Each metal contact point 92 is a bottomed cylinder-shaped member made of a conductive metal and having a circular cross-section in which the bottom surface is of slightly greater outer diameter than the glass cover 91.

The element 93 is a conductive metal wire which connects together the metal contact points 92 and is configured to break when a current of greater than or equal to a prescribed magnitude flows therethrough.

The through-window cover 94 is a rectangular plate-shaped member of greater length in a lengthwise direction than the length of the glass cover 91 in the lengthwise direction and of at least slightly greater width in a widthwise direction than the diameter of the glass cover 91, and includes clips 95 which grasp the glass cover 91 of the fuse 90 and are spaced apart by a prescribed distance in the lengthwise direction. Moreover, the through-window cover 94 is made of a non-conductive resin.

Furthermore, through holes may be formed in the through-window cover 94 at positions opposing the metal contact points 92 so as to make it possible to use a tester to test the conductivity of the element 93 via the through holes.

The fuse 90 and the through-window cover 94 configured as described above are assembled together by clipping the glass cover 91 into the clips 95, and are installed in this state into the rotary connector apparatus 1 (described later).

Note that although here the fuse 90 is installed into the connector housing body 26 to serve as a connection component in the rotary connector apparatus 1, this connection component can alternatively be selected from among circuit protection components such as resistors or diodes or from among other conductive components (not illustrated in the figures) capable of carrying current, or the like, with the selected component being held in place by the through-window cover 94 in a manner similar to the fuse 90.

As illustrated in FIG. 2, the rotator 10 of the rotary connector apparatus 1 includes a substantially ring-shaped rotating-side ring plate 11 having a substantially circular through hole in a center portion as viewed in a plan view, as well as an inner peripheral cylinder 12 formed extending downwards from the inner peripheral edge of the rotating-side ring plate 11, and these portions are formed integrally. Moreover, a rotator-side connector housing 13 (second connector housing) which functions as a connector is formed extending upwards from the upper surface of the rotating-side ring plate 11.

The rotator-side connector housing 13 houses a connection connector connected to one end of the FFC 100 housed in the housing space S and has a plurality of terminals so as to allow external connection of a connector of a cable, such as a plug or jack connected to electrical circuits of external devices such as airbag units or horn switches mounted on a steering wheel.

As illustrated in FIG. 2, the sleeve 30 to be fitted into the rotator 10 configured as described above is a substantially cylindrical member having a through hole running vertically through a center portion thereof as viewed in a plan view. The sleeve 30 is fitted into the rotator 10 from the vertical direction with the stator 20 (described later) sandwiched therebetween, thereby allowing the rotator 10 and the stator 20 to rotate relative to one another.

The stator 20 which can rotate relative to the rotator 10 is a bottomed substantially cylindrical member in which a substator 20A which is a substantially cylindrical member and a stator body 20B which is a substantially ring-shaped plate having an opening in the center portion thereof are mated together in the vertical direction, with an upper surface of the stator 20 left open.

More specifically, the stator 20 includes a fixed-side ring plate 21 which forms a bottom surface, a substantially cylindrical outer peripheral cylinder 22 which forms an outer peripheral surface, a stator mating portion 23 which mates together the substator 20A and the stator body 20B, and the stator-side connector housing 24 which protrudes out in the left direction L from the rear side of the stator 20.

The fixed-side ring plate 21 is a ring-shaped plate formed to have a slightly greater outer diameter than the outer diameter of the rotating-side ring plate 11 and has a substantially circular through hole in the center portion thereof as viewed in a plan view.

The outer peripheral cylinder 22 is cylindrical with a substantially circular shape similar to that of the fixed-side ring plate 21 and forms a cylindrical outer peripheral wall which extends upwards from the outer peripheral edge of the fixed-side ring plate 21.

Moreover, when the rotator 10 and the stator 20 are in an assembled state, the rotating-side ring plate 11 and inner peripheral cylinder 12 of the rotator 10 and the fixed-side ring plate 21 and outer peripheral cylinder 22 of the stator 20 form the housing space S which houses the FFC 100.

The stator-side connector housing 24 houses the connection connector 50 (described later) and includes a connector housing cover 25 which forms the upper surface of the stator-side connector housing 24 protruding out in the left direction L from the outer peripheral surface of the outer peripheral cylinder 22, as well as the connector housing body 26 which is formed below the connector housing cover 25.

Furthermore, the outer peripheral cylinder 22 is opened in the radial direction to the interior of the stator-side connector housing 24. In other words, the interior of the stator-side connector housing 24 is spatially connected with the housing space S formed by the rotator 10 and the stator 20.

As illustrated in FIG. 3, the connector housing body 26 is capable of housing the connection connector 50 and is a hollow substantially rectangular prism in which the upper surface and front surface are open, with the open face on the upper surface side formed to be substantially level with the fixed-side ring plate 21.

Near the bottom portion of a left-side body face 261 formed on the left direction L side of the connector housing body 26, a substantially rectangular side face through hole 27 is formed going through in the wall thickness direction.

As illustrated in FIG. 3, the side face through hole 27 includes a rectangular through-window 271 in which the long sides and short sides respectively run in the front-rear direction and the up-down direction, as well as an inspection window 272 notched out of the rear part of the bottom edge of the through-window 271.

The long sides of the through-window 271 are slightly longer than the length of the fuse 90 in the lengthwise direction and shorter than the length of the through-window cover 94 in the lengthwise direction. Moreover, the short sides of the through-window 271 are slightly longer than the inner diameter of the circular bottom surfaces of the metal contact points 92 and shorter than the width of the through-window cover 94 in the widthwise direction. In other words, the through-window 271 is configured so as to allow the fuse 90 to pass therethrough and so as to be covered by the through-window cover 94.

Alternatively, in the present embodiment, the through-window 271 may be configured such that the through-window cover 94 fits thereinto.

Meanwhile, the inspection window 272 is a rectangular through hole formed by notching out the rear part of the bottom edge of the through-window 271 by an amount equal to the wall thickness of a conductivity inspection portion 77 (described later), and the width (that is, length in the front-rear direction) of the inspection window 272 is substantially equal to the width of the conductivity inspection portion 77.

As illustrated in FIGS. 3, 4A, and 4C, the connection connector-equipped flat cable 40 installed in the rotary connector apparatus 1 configured as described above includes the two-layer FFC 100 (100A and 100B), a portion of which is housed in the housing space S, as well as the connection connector 50 (50A and 50B) formed on the ends of the FFC 100. The connection connectors 50A and 50B connected to the two-layer FFC 100 are overlaid on one another and housed in a housing case 80.

As illustrated in FIGS. 4A and 4C, the FFC 100 includes a plurality of band-shaped conductors 101 arranged parallel to one another, and an insulating sleeve 102 which sandwiches and insulates the band-shaped conductors 101. Here, the FFC 100A connected to the connection connector 50A includes eight of the band-shaped conductors 101, and the FFC 100B connected to the connection connector 50B includes seven of the band-shaped conductors 101.

Moreover, in the FFC 100, a portion of the insulating sleeve 102 near the side connected to the connection connector 50 is stripped, thereby forming an exposed conductor portion 103 in which the band-shaped conductors 101 are exposed for a prescribed length.

Note here that the band-shaped conductors 101 of the FFC 100 may be wide conductors of the type used in airbag circuits, and that all of the plurality of band-shaped conductors 101 of the FFC 100 may be wide conductors or just some of the plurality of band-shaped conductors 101 may be wide conductors, for example. Furthermore, the band-shaped conductors 101 may be wide conductors in both or either one of the FFC 100A and FFC 100B.

As illustrated in FIGS. 4A to 4D, the connection connector 50 (50A and 50B) includes a resin holder 60 (60A and 60B) and a plurality of busbars 70.

The resin holder 60 (60A and 60B) is an insulating resin member which holds the plurality of busbars 70 (described later) in an integral manner. Note that as long as the resin holder 60 has insulating properties, the resin holder 60 does not necessarily need to be made of a resin.

More specifically, the resin holder 60A of the connection connector 50A has a substantially wide rectangular shape when viewed in a side view and includes a busbar mounting portion 61 in which the plurality of busbars 70 are fixedly mounted in an insulatable manner, a recess-shaped FFC installation portion 62 on the left direction L side onto which the FFC 100A is mounted, a separate molded cover 63 which holds in place the FFC 100A installed into the FFC installation portion 62, a molded cover locking portion 64 into which the molded cover 63 mates, and a right-side protrusion 65 which protrudes out from the upper edge in the right direction R.

Moreover, a busbar-exposing portion 66 which exposes conductor connection portions 73 of the busbars 70 mounted in the busbar mounting portion 61 is formed near a center portion of the FFC installation portion 62.

The molded cover 63 (63A and 63B) is wider than the FFC 100 (100A and 100B) and is substantially C-shaped when viewed in a side view, with locking portions which lock into the molded cover locking portion 64 (described below) formed on both the front and rear ends.

The molded cover locking portion 64 mates together with the molded cover 63 and includes a rear locking portion 641 in which the rear side near the busbar-exposing portion 66 is recessed towards the front direction, as well as a through-locking portion 642 which goes through the portion of the resin holder 60A formed near the front side of the busbar-exposing portion 66 in the wall thickness direction.

The opening portions on both ends of the molded cover 63 respectively lock into the rear locking portion 641 and the through-locking portion 642, thereby making it possible to hold in place the FFC 100 installed in the resin holder 60.

Although the resin holder 60B of the connection connector 50B has a different shape and arrangement than the resin holder 60A, the overall configuration is similar except in that no right-side protrusion 65 is included, and therefore the resin holder 60B will not be described in detail here.

As illustrated in FIGS. 4B and 4D, the busbars 70 which are integrally supported by the resin holder 60 are conductive metal bars which are substantially L-shaped when viewed in a side view or have a substantially inverted L-shape in which the L-shape is vertically inverted when viewed in a side view, and generally include connecting portions 72 having connection pins 71 on the ends thereof, as well as conductor connection portions 73 which are orthogonal to the connecting portions 72 and are connected to the band-shaped conductors 101.

Moreover, the connecting portion 72 of the busbar 70H has a bent elbow portion 78 which bends upward at the rear side of the connection pin 71 and shifts the connection pin 71 in the right direction R.

More specifically, of the eight busbars 70 arranged in the connection connector 50A, the busbars 70B and 70C (the busbars 70B and 70C in that order from the lower side) arranged near the bottom of the resin holder 60A are substantially L-shaped when view in a side view, and the remaining busbars 70D to 70H (similarly arranged in that order from the lower side) arranged near the upper side have a substantially inverted L-shape when viewed in a side view.

Similarly, the busbars 70I, 70J, and 70K arranged near the bottom of the resin holder 60B are substantially L-shaped when viewed in a side view, and the remaining busbars 70L, 70M, and 70N arranged in that order from the downward direction have a substantially inverted L-shape when viewed in a side view.

In the busbar 70A arranged on the lowermost side of the connection connector 50A, unlike in the busbar 70B or the busbar 70C, the connecting portion 72 and the conductor connection portion 73 are not connected together. Instead, a connector-side conductive portion 74 and a conductor-side conductive portion 75 which are plate-shaped and made of the same metal as the busbars 70 are respectively formed on the base end side of the connecting portion 72 and on the lower end of the conductor connection portion 73, and a protection device holder having component installation portions (sockets) 76 into which the fuse 90 can be installed are respectively formed in the connector-side conductive portion 74 and the conductor-side conductive portion 75. Moreover, the conductivity inspection portion 77 is formed on the bottom of the conductor-side conductive portion 75 formed on the conductor connection portion 73 side.

The component installation portions (sockets) 76 (collectively, a protection device holder) are each made of a conductive metal and have a substantially C-shaped shape opening towards the left direction L. The inner diameter of each component installation portion 76 is slightly smaller than the outer diameter of the metal contact points 92 of the fuse 90.

Furthermore, the distance between the component installation portions 76 formed on the connector-side conductive portion 74 and the conductor-side conductive portion 75 is substantially equal to the distance between the metal contact points 92, and the component installation portions 76 are arranged at positions that face the through-window 271 when the connection connector 50 is housed inside the connector housing body 26. In addition, the distance between the component installation portions 76 and the left-side body face 261 of the connector housing body 26 in this housed state is designed to be substantially equal to the distance between the glass cover 91 and the through-window cover 94.

The conductivity inspection portion 77 is a metal plate formed by bending the bottom edge of the conductor-side conductive portion 75 in the left direction L, and the extension length in the left direction L is slightly less than the distance between the left-side body face 261 and the conductor-side conductive portion 75 when the connection connector 50A is housed inside the connector housing body 26.

The conductivity inspection portion 77 configured as described above is formed at a position that faces the inspection window 272 when the connection connector 50 is housed inside the connector housing body 26. Moreover, the end of the conductivity inspection portion 77 is housed within the connector housing body 26 in the right direction R from the inspection window 272.

Alternatively, this end may protrude out from the inspection window 272 in the left direction L or may fit into the inspection window 272 and be level with the left-side body face 261.

Furthermore, the conductivity inspection portion 77 is connected to the conductor connection portion 73 via the conductor-side conductive portion 75, and therefore when the conductor connection portion 73 is connected to the FFC 100, the conductivity inspection portion 77 and the FFC 100 form an electrical circuit.

As illustrated in FIGS. 4A and 4C, the busbars 70A to 70H and the busbars 70I to 70N configured as described above are installed into the connection connectors 50A and 50B, with the connection pins 71 protruding out in the front direction from the front faces of the resin holders 60A and 60B and the conductor connection portions 73 being exposed on the left side of the busbar-exposing portion 66 in the order described above.

Moreover, the connection pin 71 of the busbar 70H having the bent elbow portion 78 protrudes out from the side face side of the right-side protrusion 65 at the same position in the width direction as the position of the connection pin 71 of the busbar 70G.

Furthermore, as illustrated in FIG. 4A, the connector-side conductive portion 74 and the conductor-side conductive portion 75 of the busbar 70A, in which the component installation portions 76 are formed, are arranged so as to protrude further downward at the bottom of the connection connector 50A.

In addition, as illustrated in FIG. 5, in the connection connector 50 configured with the busbars 70 installed in the resin holder 60 configured as described above, the FFC 100 can be installed to the connection connector 50 by arranging the FFC 100 into the FFC installation portion 62 such that the busbar-exposing portion 66 and the exposed conductor portion 103 face one another, respectively bonding the band-shaped conductors 101 exposed in the exposed conductor portion 103 to the conductor connection portions 73 exposed in the busbar-exposing portion 66, and then locking the molded cover 63 into place.

The housing case 80 into which the connection connector 50 with the FFC 100 connected thereto as described above is installed is a hollow rectangular prism open on the front and rear sides, where a female connector (not illustrated in the figure) connected to another external device can be fitted into the front side, and the front side of the connection connector 50 (50A and 50B) can be installed into the rear side.

More specifically, with the connection connector 50A and the connection connector 50B arranged overlaid on one another, the connection pins 71 are inserted into the housing case 80 from the rear side, so that the connection connector 50 is installed into the housing case 80.

Moreover, when the connection connector 50A and the connection connector 50B are arranged overlaid on one another, the connection pin 71 of the busbar 70H which protrudes in the front direction from the right-side protrusion 65 of the connection connector 50A is arranged above the connection pin 71 of the busbar 70N which protrudes in the front direction from the connection connector 50B, and is also arranged substantially in line with the connection pins 71 of the busbars 70I to 70N.

The connection pins 71 of the connection connector 50 installed into the housing case 80 as described above protrude in the front direction inside the housing case 80. In other words, the housing case 80 assembled together with the connection connector 50 is a male connector having connection pins arranged in two columns with seven pins per column.

Moreover, the FFC 100 connected to the connection connector 50 can be passed through the stator-side connector housing 24 and arranged within the housing space S formed by the rotor 10 and the stator 20.

Next, installation and removal of the fuse 90 with respect to the rotary connector apparatus 1 configured with the connection connector 50 having the FFC 100 fixed thereto housed inside the connector housing body 26 (the stator-side connector housing 24) will be described with reference to FIG. 6.

As described above, in the rotary connector apparatus 1 in the state in which the connection connector-equipped flat cable 40 is housed in the stator-side connector housing 24, the component installation portions 76 and the through-window 271 are arranged facing one another, and the through-window 271 is formed to allow the glass cover 91 to be inserted therethrough, thereby making it possible to insert the fuse 90 through the through-window 271.

Furthermore, the distance between the glass cover 91 and the through-window cover 94 is substantially equal to the distance between the component installation portions 76 and the left-side body face 261 (the left side face of the connector housing body 26), and therefore by arranging the through-window cover 94 so as to cover the through-window 271 and have the bottom edge thereof contact the upper edge of the inspection window 272, the fuse 90 inserted through the through-window 271 mates into the component installation portions 76.

Here, although the diameter of the metal contact points 92 on both ends of the fuse 90 is slightly greater than the diameter of the component installation portions 76, the component installation portions 76 are elastic structures, and therefore by pushing the metal contact points 92 into the component installation portions 76, the component installation portions 76 spread slightly and make it possible to fit the metal contact points 92 in a sandwiched manner.

As a result, the connection pin 71 and the conductor connection portion 73 are electrically connected via the fuse 90, and the connection pin 71 and conductor connection portion 73 of the busbar 70A form a conductive path.

Moreover, because the component installation portions 76 are elastic, pulling the through-window cover 94 in the left direction L causes the component installation portions 76 to spread slightly, allowing the metal contact points 92 to be removed. This makes it possible to easily remove the fuse 90 installed in the component installation portions 76.

The rotary connector apparatus 1 configured as described above includes a ring-shaped stator 20, a ring-shaped rotator 10 rotatably fitted to the stator 20, an FFC 100 housed in a housing space S formed by the stator 20 and the rotor 10, a connection connector 50 (connection connector 50A) having busbars 70 (busbar 70A) and connected to an end of the FFC 100, and a connection component such as the fuse 90 that is installed into and removed from the connection connector 50 (connection connector 50A). The busbars 70 include connection pins 71 to be connected to other terminals, conductor connection portions 73 which are electrically connected to the FFC 100, and component installation portions 76 into which the connection component such as the fuse 90 that electrically connects the connection pin 71 and the conductor connection portion 73 is removably installed. This makes it possible to prevent damage to an electrical circuit due to inflow of overcurrent, makes it possible to easily replace the connection component, and also makes it possible to improve maintainability.

For example, by forming in the busbar 70A the component installation portions 76 that allow the fuse 90 which electrically connects the connection pin 71 and the conductor connection portion 73 to be removably installed, it becomes possible to electrically connect the connection pin 71 and the conductor connection portion 73 of the busbar 70A as described above. Therefore, even if overcurrent flows into the electrical circuit, the element 93 breaks and interrupts the flow of current, thereby making it possible to prevent inflow of overcurrent to the electrical circuit and also making it possible to prevent damage to the electrical circuit.

Moreover, in comparison to a configuration in which a fuse is connected by being welded or the like into the rotary connector apparatus, the present configuration makes it possible to easily remove the fuse 90 from the connection connector 50 and also makes it possible to easily replace the fuse 90 with a new fuse 90, thereby making it possible to improve maintainability.

Furthermore, instead of being the fuse 90, the connection component can be selected from among circuit protection components such as resistors or diodes or from among other conductive components or the like capable of carrying current. For example, when an external device that does not need to include a circuit protection component such as a fuse or a resistor is installed in a vehicle body, a conductive component that simply carries current between the connection pin 71 and the conductor connection portion 73 as is can be selected as the connection component. In other words, due to being able to select a connection component that is suitable for the intended use case, rotary connector apparatuses compatible with various different vehicle types or designs can be easily prepared, general-purpose versatility can be improved, and the number of components can be reduced.

In addition, even when the design of the external device is changed, for example, the fuse 90 can be easily replaced with a fuse or resistor or the like that is suitable for the external device, thereby making it possible to reliably prevent damage to the electrical circuit.

Thus, forming in the busbar 70 the component installation portions 76 into which connection components can be readily installed and removed makes it possible to prevent damage to the electrical circuit and also makes it possible to easily replace the connection component (such as the fuse 90). This, in turn, makes it possible to improve the maintainability of the rotary connector apparatus 1.

Moreover, using an elastic material for at least one of the component installation portions 76 respectively provided on the connection pin 71 side and the conductor connection portion 73 side makes it possible to easily and reliably install and remove connection components such as the fuse 90, thereby making it possible to improve the efficiency of the replacement process.

Furthermore, in the busbars 70, by providing the conductivity inspection portion 77 to which a conductivity inspection device can be connected to test the conductivity of the fuse 90 between the conductor connection portion 73 and the component installation portions 76 of the busbars 70, the conductivity of the connection component such as the fuse 90 can be easily tested.

More specifically, as illustrated in FIG. 7, because the connection pin 71 of the busbar 70A and the conductivity inspection portion 77 form an electrical circuit via the fuse 90 installed in the component installation portions 76, a conductivity inspection device M can be connected to the conductivity inspection portion 77 to test the conductivity of the fuse 90 (that is, to test for breakage or the like of the fuse 90) without having to go through the band-shaped conductors 101. This makes it possible to further improve maintainability.

In addition, because the band-shaped conductor 101 of the FFC 100A connected to the conductor connection portion 73 of the busbar 70A is connected to the conductivity inspection portion 77, the conductivity inspection device M can be connected to the conductivity inspection portion 77 and to another end of this band-shaped conductor 101 of the FFC 100A in order to simultaneously test the conductivity of the band-shaped conductor 101 (that is, to test for damage or the like to the band-shaped conductor 101). This makes it possible to further improve maintainability (see FIG. 7).

Moreover, if the end of the conductivity inspection portion 77 protrudes out of or fits into the inspection window 272 notched out of the bottom of the through-window 271, the through-window 272 is covered by the conductivity inspection portion 77. This makes it possible to connect the conductivity inspection device M to the conductivity inspection portion 77 from the outside and also makes it possible to prevent foreign materials such as dust from infiltrating the rotary connector apparatus 1 from the outside via the inspection window 272.

Furthermore, the connector housing body 26 houses the connection connector 50 and is connected to the housing space S formed by the rotator 10 and the stator 20, and the through-window 271 through which the removable fuse 90 can be inserted is formed in a facing portion on the outer side of the connector housing body 26 which faces the component installation portions 76 (that is, in the left-side body face 261 of the connector housing body 26). This makes it possible to replace the fuse 90 via the through-window 271 from the outside of the connector housing body 26 without having to remove the connection connector 50 from the rotary connector apparatus 1, thereby further improving the maintainability of the rotary connector apparatus 1.

In addition, the through-window 271 is formed in a surface that runs in the direction of the axis of rotation of the rotator 10 (i.e., is formed in the left-side body face 261 formed on the left direction L side of the connector housing body 26). This makes it easier for the fuse 90 to access the component installation portions 76 via the through-window 271 formed in the connector housing body 26, and thereby makes it possible to replace the fuse 90 more easily.

Moreover, the through-window 271 is formed on the left direction L side of the rotary connector apparatus 1, which, in comparison to if the through-window was formed in the top, makes it possible to reduce infiltration of foreign materials such as dust into the rotary connector apparatus 1.

Furthermore, including the through-window cover 94 which covers the through-window 271 makes it possible to prevent foreign materials such as dust or small rocks, for example, from infiltrating into the rotary connector apparatus 1 via the through-window 271, thereby making it possible to prevent occurrence of abnormal noises or physical damage to the FFC 100 housed inside the rotary connector apparatus 1.

In addition, the inspection window 272 through which the conductivity inspection device M can be inserted is formed in the facing portion of the left-side body face 261 of the connector housing body 26 that faces the conductivity inspection portion 77. This makes it possible to form an electrical circuit by connecting the conductivity inspection device M to the conductivity inspection portion 77 from the outside via the inspection window 272 formed in the connector housing body 26, which makes it possible to test the conductivity of the fuse 90 and the FFC 100.

This, in turn, makes it possible to test the conductivity of the fuse 90 and the FFC 100 without having to remove the connection connector 50 from the rotary connector apparatus 1, thereby making it possible to further improve the maintainability of the rotary connector apparatus 1.

Moreover, by combining the fuse 90 and the through-window cover 94 together and by configuring the through-window cover 94 to cover the through-window 271 when the fuse 90 is installed into the component installation portions 76, it becomes possible to install the fuse 90 and cover the through-window 271 simultaneously, thereby making it possible to improve the efficiency of replacing the connection component. This also makes it possible to reduce the number of components.

Meanwhile, the fuse 90 and the through-window cover 94 do not necessarily have to be assembled together, and the through-window cover 94 may be part of the connector housing body 26, or a separate through-window cover 94 may be provided, for example. In this case, configuring the through-window cover 94 to be part of the connector housing body 26 makes it possible to use a so-called commercially available off-the-shelf fuse 90, which is advantageous in terms of improving general-purpose versatility.

Furthermore, integrally forming (i.e., continuously connecting) the through-window 271 and the inspection window 272 makes it possible to test the conductivity of the fuse 90 from the outside via the through-window 271 and also makes it possible to replace the fuse 90. In other words, conductivity testing and replacement of the fuse 90 can be performed from a single location, which makes it possible to improve the work efficiency of replacing the fuse 90 and further improves maintainability.

In addition, integrally forming the through-window 271 and the inspection window 272 makes it possible to prevent decreases in the strength of the connector housing body 26 and also makes it possible to reduce infiltration routes for foreign materials such as dust, thereby making it possible to inhibit infiltration of such foreign materials.

Embodiment 2

Figure 8A:
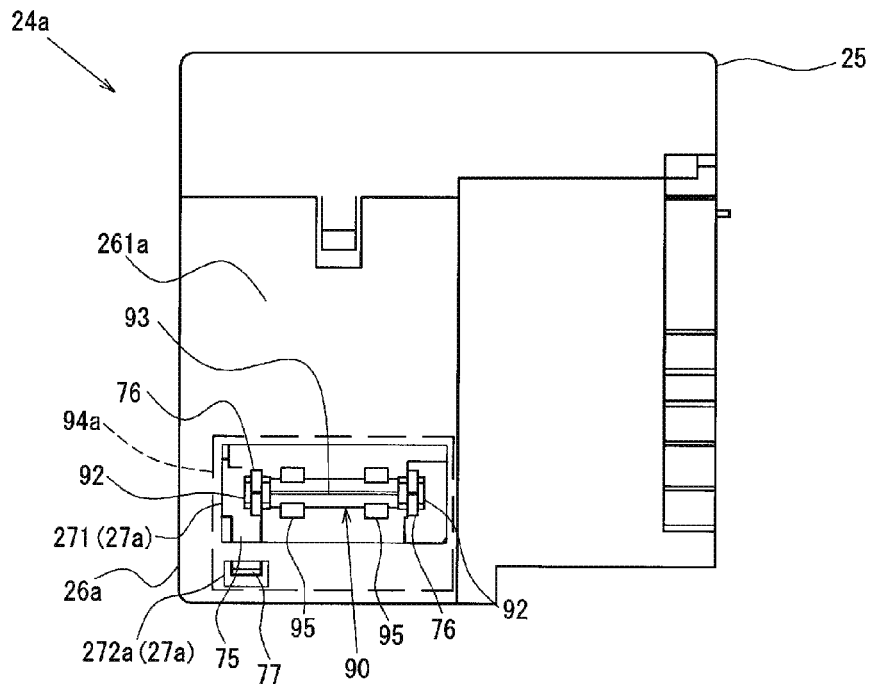
FIG. 8A is an explanatory side view of how a connection component is installed in Embodiment 2 of the present invention.

Although in the embodiment described above the through-window 271 and the inspection window 272 are integrally formed (continuously connected), the through-window 271 and the inspection window 272 do not necessarily have to be integrally formed. As illustrated in FIG. 8A, for example, the through-window 271 and the inspection window 272 may be formed separately.

Next, a rotary connector apparatus 1a in which the through-window 271 and the inspection window 272 are formed separately will be briefly described.

Note that components in the rotary connector apparatus 1a that are the same as in the rotary connector apparatus 1 described above will be given the same reference characters as above and will not be described again here.

Figure 8B:
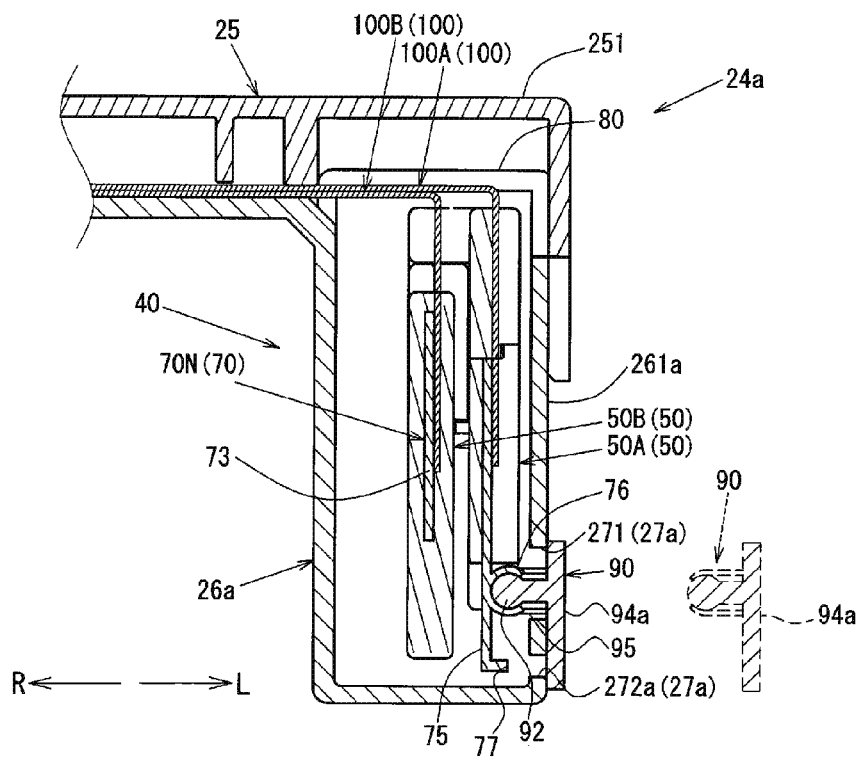
FIG. 8B is an explanatory cross-sectional view of how the connection component is installed in Embodiment 2.

FIGS. 8A and 8B are explanatory drawings of a stator-side connector housing 24a which houses a connection connector-equipped flat cable 40. More specifically, FIG. 8A is a side view illustrating the stator-side connector housing 24a as viewed from the left side in a state in which a fuse 90 is installed in a connection connector 50. FIG. 8B is a cross-sectional view illustrating, as viewed from the rear direction, a connector housing body 26a in a state in which the fuse 90 is installed in a connection connector 50A, where this cross-section is taken running through a conductor connection portion 73 connected to a busbar 70A.

In the rotary connector apparatus 1a, similar to in the rotary connector apparatus 1, a side face through hole 27a is formed in a left-side body face 261a of the connector housing body 26a of the stator-side connector housing 24a.

The side face through hole 27a includes a through-window 271 through which the fuse 90 can be inserted as well as an inspection window 272a formed below the through-window 271 with a prescribed distance therebetween.

The inspection window 272a is a rectangular through hole formed at a position that faces a conductivity inspection portion 77 (described later) when the connection connector 50A is housed inside the connector housing body 26a, and has dimensions in the lengthwise direction and widthwise direction that are at least somewhat greater than the wall thickness and width of the conductivity inspection portion 77 so as to allow a connection probe of a conductivity inspection device M to be inserted through the inspection window 272a.

The end of the conductivity inspection portion 77 formed by bending the bottom edge of a conductor-side conductive portion 75 of the busbar 70A in the left direction L is contained within the connector housing body 26a when the connection connector 50A is housed inside the connector housing body 26a. In other words, the conductivity inspection portion 77 does not protrude out of the inspection window 272a in the left direction L.

Moreover, a through-window cover 94a which holds the fuse 90 that can be inserted through the through-window 271 is a plate-shaped member of a size that makes it possible to completely cover the side face through hole 27a when the fuse 90 is installed.

In the rotary connector apparatus 1a configured as described above, the side face through hole 27a can be reliably covered by the through-window cover 94a, thereby making it possible to reliably prevent infiltration of foreign materials into the connector housing body 26a and also making it possible to reliably prevent conduction abnormalities caused by wires or the like unexpectedly contacting the conductivity inspection portion 77 from the outside.

As described above, although the rotary connector apparatus 1a is different from the rotary connector apparatus 1 in that the through-window 271 and the inspection window 272a of the side face through hole 27a are not formed integrally, the rotary connector apparatus 1a has the same advantageous effects as the rotary connector apparatus 1 in terms of facilitating easy installation and removal of a connection component such as the fuse 90 as well as in terms of making it possible to test the conductivity of the connection component such as the fuse 90 while the connection connector 50 remains housed inside the connector housing body 26a, for example.

Moreover, although in the rotary connector apparatus 1a the inspection window 272a is covered by the through-window cover 94a, this configuration is not necessarily required. For example, similar to in the rotary connector apparatus 1, the inspection window 272a may be blocked by the conductivity inspection portion 77, or a cover that covers the inspection window 272a may be provided separately.

Furthermore, despite being substantially C-shaped in Embodiments 1 and 2, the component installation portions 76 are not necessarily limited to having this shape and may be configured to sandwich the connection component in a manner similar to a clip or the like or may be configured to lock together with the connection component, or another member may be used to install the connection component in the installation portions. In other words, the shape is not particularly limited as long as the configuration corresponds to the configuration of the connection component and allows the connection component to be installed and removed.

Embodiment 3

Figure 9:
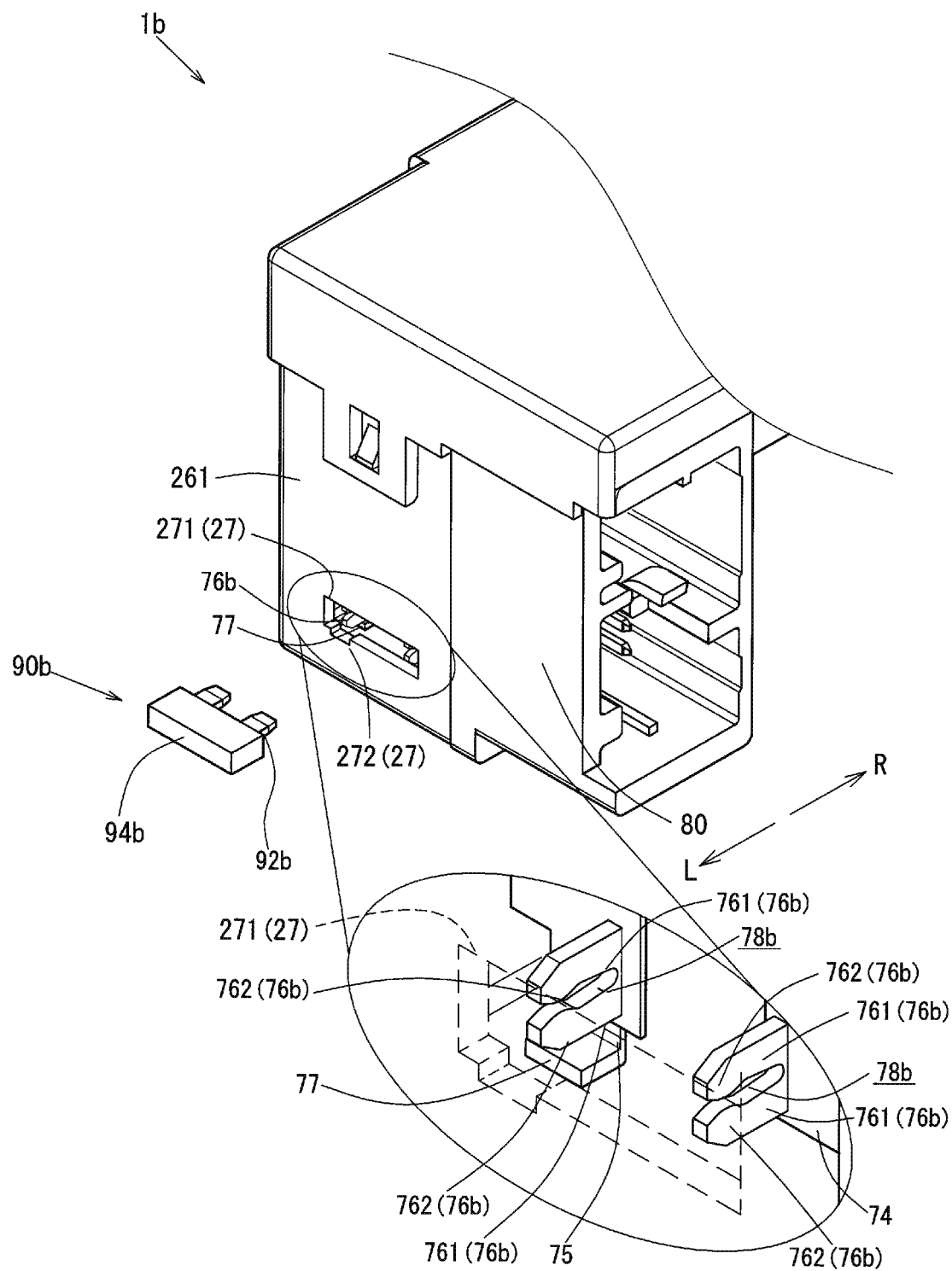
FIG. 9 is a perspective view of a connector housing body 26 in a state in which a blade fuse is not installed in Embodiment 3 of the present invention.

More specifically, although in the rotary connector apparatus 1 the connection component is the fuse 90 configured as illustrated in FIGS. 1B and 1C, the connection component may be a so-called blade fuse 90b such as that illustrated in FIG. 9.

In this case, the shape of the component installation portions 76 that lock in the blade fuse 90b is changed to accommodate the blade fuse 90b.

Next, a rotary connector apparatus 1b in which the connection component is such a blade fuse 90b will be briefly described with reference to FIGS. 9 and 10.

Note that components in the rotary connector apparatus 1b described below that are the same as in the rotary connector apparatus 1 in the embodiment described above will be given the same reference characters as above and will not be described again here.

FIG. 9 includes a perspective view schematically illustrating a connector housing body 26 in a state in which the blade fuse 90b is not installed in a connection connector 50A, as well as an enlarged perspective view in which the region enclosed in the ellipse is enlarged. In the enlarged perspective view, the connector housing body 26 and a side face through hole 27 are illustrated in dashed lines to make the connector housing body 26 see-through and thus better show the shape of component installation portions 76b of busbars 70, which are illustrated in solid lines.

Figure 10:
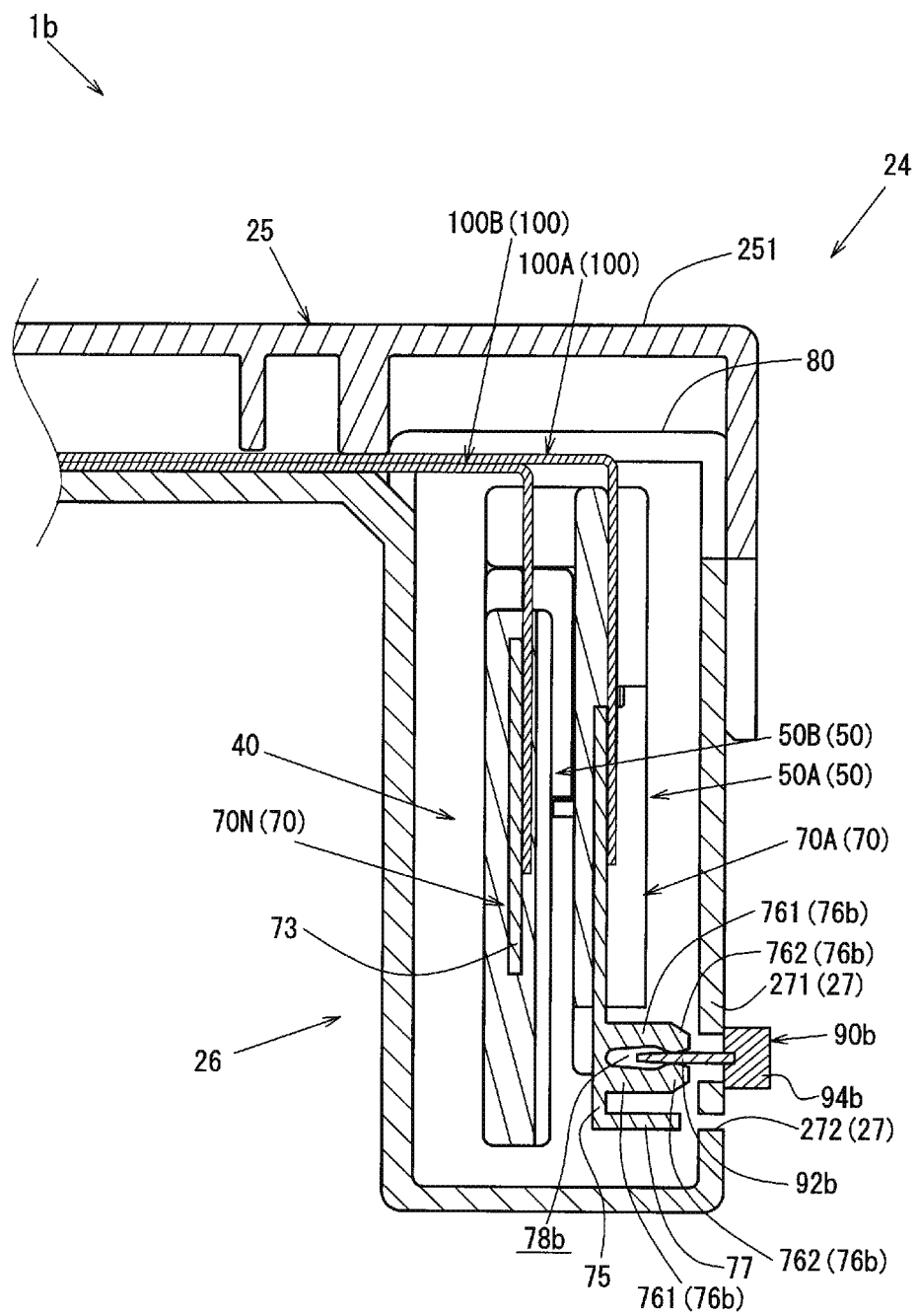
FIG. 10 is a cross-sectional view of a connector housing in a state in which the blade fuse is installed in Embodiment 3.

FIG. 10 is a cross-sectional view similar to FIG. 6 schematically illustrating the connector housing body 26 in a state in which the blade fuse 90b is installed in the connection connector 50A.

As illustrated in FIG. 9, the blade fuse 90b includes two flat plate-shaped metal prongs 92b that are made of metal and arranged separated from one another by a prescribed distance, as well as a through-window cover 94b which holds the flat plate-shaped metal prongs 92b.

The flat plate-shaped metal prongs 92b are conductive metal plates in which the ends (the right direction R sides) are tapered in the vertical direction and are also tapered slightly in the front-rear direction.

The through-window cover 94b is a rectangular cuboid in which the dimensions in the lengthwise direction and the widthwise direction are greater than the dimensions of a through-window 271 in the lengthwise direction and the widthwise direction. In other words, the through-window 271 of the rotary connector apparatus 1*b* is configured such that only the flat plate-shaped metal prongs 92*b* (described later) can be inserted.

The through-window cover 94*b* configured as described above holds the flat plate-shaped metal prongs 92*b* separated from one another by a prescribed distance in the front-rear direction, and inside the through-window cover 94*b*, the flat plate-shaped metal prongs 92*b* are connected to one another by an element (not illustrated in the figure).

Moreover, a conductivity testing hole (not illustrated in the figure) that makes it possible to check a conductor connected to the element is formed in the rear face of the through-window cover 94*b* (the side face on the left direction L side in FIG. 9). This makes it possible to test the conductivity of the element by inserting a tester into the conductivity testing hole. However, configurations that do not have a conductivity testing hole are also possible.

Next, the configuration of the component installation portions 76*b* respectively provided on a connector-side conductive portion 74 and a conductor-side conductive portion 75 will be briefly described.

As illustrated in the enlarged perspective view in FIG. 9, each component installation portion 76*b* is a tuning fork terminal in which a slit 78*b* which is substantially U-shaped when viewed in a front view is formed by notching out the center portion of a flexible metal plate from the left direction L towards the right direction R.

More specifically, in each component installation portion 76*b*, a pair of clamping pieces 761 which are arranged in the vertical direction so as to form the slit 78*b* and protrusions 762 which protrude in the direction in which the left direction L side ends of the respective clamping pieces 761 face one another (that is, towards the slit 78*b* side) are integrally formed.

As illustrated in FIG. 9, the clamping pieces 761 are plate-shaped members which are substantially rectangular when viewed in a front view and extend in the left-right direction, with the base end sides (the right direction R sides) mating together (not illustrated in the figure) with the connector-side conductive portion 74 or the conductor-side conductive portion 75. Moreover, the sides of each clamping piece 761 that face one another slant so as to become closer to one another going towards the right direction R and eventually intersect. The intersection portion is formed to be substantially U-shaped with an arc-shaped chamfer when viewed in a front view.

The protrusions 762 are plate-shaped members which are substantially semicircular when viewed in a front view and are formed to protrude in the direction in which the ends of each pair of clamping pieces 761 face one another, with the gap at the position where the protrusions 762 are closest to one another being smaller than the wall thickness of the flat plate-shaped metal prongs 92*b*.

Inserting the flat plate-shaped metal prongs 92*b* into the slits 78*b* of the component installation portions 76*b* configured as described above causes the clamping pieces 761 having the protrusions 762 formed on the ends thereof to spread apart and also causes the protrusions 762 to sandwich the flat plate-shaped metal prongs 92*b* in place, which makes it possible to electrically connect the connector-side conductive portion 74 to the conductor-side conductive portion 75.

Moreover, when the flat plate-shaped metal prongs 92*b* are installed into the component installation portions 76*b*, the through-window cover 94*b* fits into the through-window 271, with the left-side face of the through-window cover 94*b* protruding out slightly from a left-side body face 261 in the left direction L. In other words, the through-window 271 is covered by the through-window cover 94*b*.

When the blade fuse 90*b* is installed into the connection connector 50 (the component installation portions 76*b*) in this manner, the blade fuse 90*b* makes it possible to electrically connect the connector-side conductive portion 74 and the conductor-side conductive portion 75, thereby making it possible to electrically connect the FFC 100 to an external device connected to the connection connector 50. Moreover, when overcurrent caused by external noise or the like flows in, the element connecting together the flat plate-shaped metal prongs 92*b* breaks to interrupt the flow of current, thereby making it possible to prevent damage to the FFC 100 and the like.

Furthermore, inserting a tester through the inspection window 272 and bringing the tester into contact with the conductivity inspection portion 77 makes it possible to test the conductivity of the FFC 100 without removing the blade fuse 90*b*, regardless of the conducting state of the element connecting together the flat plate-shaped metal prongs 92*b*. This makes it possible to easily test for damage to the FFC 100.

In addition, due to how the blade fuse 90*b* fits into the through-window 271, the flat plate-shaped metal prongs 92*b* can be accurately installed into the component installation portions 76*b*, and due to how the through-window cover 94*b* protrudes out in the left direction L, the through-window cover 94*b* can be easily gripped and removed from the through-window 271. This makes it possible to easily replace the blade fuse 90*b* when the blade fuse 90*b* breaks or when design changes are made, thereby improving usability.

Note that despite being described here as flat plate-shaped members in which the wall thickness runs in the vertical direction, the flat plate-shaped metal prongs 92*b* of the blade fuse 90*b* may alternatively be flat plate-shaped members in which the plate width runs in the vertical direction and the wall thickness runs in the front-rear direction, for example. In this case, the clamping pieces 761 of each component installation portion 76*b* are configured to form a pair in the front-rear direction.

Figure 11A:
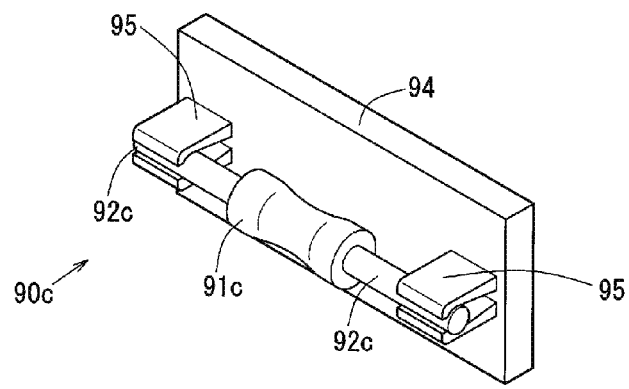
FIG. 11A is an explanatory perspective view of a resistor.

Moreover, although here a blade fuse 90*b* is connected to into the component installation portions 76*b*, depending on the vehicle type or design, a resistor or diode or the like having lead wires formed on both ends as illustrated in FIG. 11A can be connected in place of a blade fuse 90*b* or the like.

Next, a configuration in which a resistor 90*c* is connected into the component installation portions 76*b* as the connection component will be briefly described with reference to FIGS. 11A and 11B.

Figure 11B:
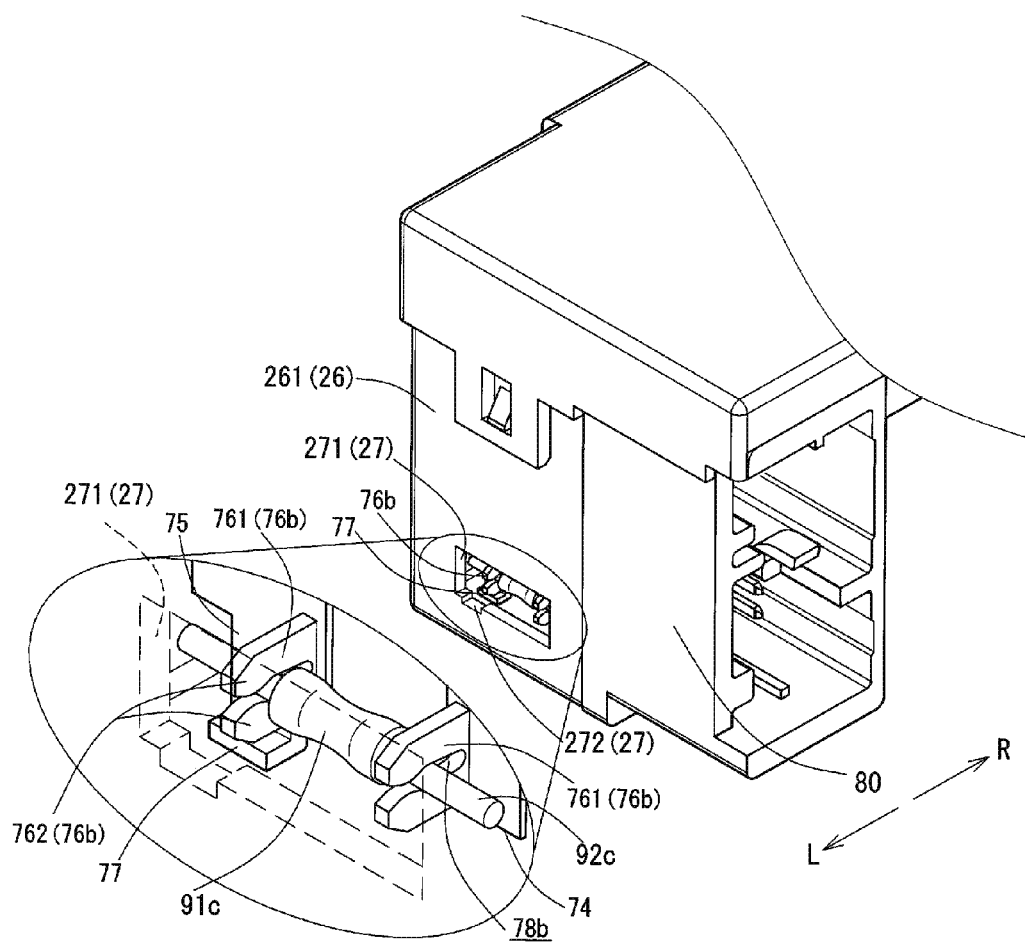
FIG. 11B is an explanatory perspective view schematically illustrating how the resistor is installed.

FIG. 11A is a perspective view schematically illustrating the resistor 90*c*, and FIG. 11B is a perspective view schematically illustrating a state in which the resistor 90*c* is installed into the component installation portions 76*b*. The enlarged perspective view shows the region enclosed in an ellipse in the schematic perspective view (that is, the connection site between the resistor 90*c* and the component installation portions 76*b*) in greater detail. Note that in the enlarged perspective view in FIG. 11B, in order to better show how the resistor 90*c* is installed, the through-window cover 94 and the clips 95 are not illustrated, and the connector housing body 26 and the side face through hole 27 are illustrated in dashed lines to make the connector housing body 26 see-through.

More specifically, as illustrated in FIG. 11A, the resistor 90*c* includes a resistive element 91*c* of prescribed resistance as well as conductive lead wires 92c formed on both ends of the resistive element 91c, and similar to the fuse 90, the resistor 90c is held by the through-window cover 94 which includes clips 95 that are separated by a prescribed distance in the lengthwise direction and hold the lead wires 92c.

As illustrated in FIG. 11B, in the resistor 90c configured as described above, inserting the lead wires 92c into the slits 78b causes the clamping pieces 761 including the protrusions 762 to spread apart slightly and also causes the component installation portions 76b to sandwich and hold in place the lead wires 92c. This keeps the resistor 90c fixed in place by the component installation portions 76b and makes it possible to electrically connect the connector-side conductive portion 74 and the conductor-side conductive portion 75. Note that although in the present embodiment the component installation portions 76b are configured to be able to hold both the blade fuse 90b and the resistor 90c, the configuration of the component installation portions 76b may be adjusted in accordance with the connection component to be held, or an adjustment mechanism may be included to make it possible to reliably hold the connection component using an elastic member or the like.

Moreover, although the through-window cover 94 is configured to be slightly larger than the through-window 271, the through-window cover 94 may be shaped to fit into the through-window 271 in a manner similar to the through-window cover 94b or may be configured to also cover the inspection window 272 in a manner similar to the through-window cover 94a, for example.

In the configuration of the present invention and the embodiments described above, the fixed member corresponds to the stator 20;

the rotating member corresponds to the rotator 10;

the conductor corresponds to the band-shaped conductors 101;

the connection component corresponds to the fuse 90, the blade fuse 90b, and the resistor 90c;

the connection terminal portion corresponds to the connection pins 71;

the connector housing corresponds to the connector housing body 26 and the connector housing body 26a;

the cover member corresponds to the through-window cover 94, the through-window cover 94a, and the through-window cover 94b;

the conductivity inspection window corresponds to the inspection window 272 and the inspection window 272a; and the installation terminals correspond to the component installation portions 76 and the component installation portions 76b. However, the present invention is not limited only to the configurations of the embodiments described above, and various other embodiments are possible.

For example, although the through-window 271 and the inspection window 272 are formed in the left-side body face 261, these openings do not necessarily have to be formed in the left-side body face 261 and may alternatively be formed in the rear face of the connector housing body 26 or in the bottom surface or the like of the connector housing body 26, for example.

Moreover, although in the present embodiment the conductivity inspection portion 77 is formed by being bent in the left direction L, the conductivity inspection portion 77 may alternatively be unbent and have a shape that extends straight downwards, for example.

Furthermore, although the component installation portions 76b were described as being tuning fork terminals which form an electrical connection by sandwiching the flat plate-shaped metal prongs 92b formed to be plate-shaped members, the flat plate-shaped metal prongs 92b may be replaced with elastic tuning fork terminal structures which form an electrical connection by sandwiching component installation portions 76b formed to be plate-shaped, for example.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A rotary connector apparatus, comprising:

a ring-shaped fixed member;

a ring-shaped rotating member rotatably fitted to the fixed member;

a flexible flat cable housed in a housing space formed by the fixed member and the rotating member, the flexible flat cable having a plurality of wires, one end of the flexible flat cable being fixed to the fixed member and another end thereof being fixed to the rotating member;

a first connector housing attached to the fixed member, the first connector housing having a plurality of first terminals that are to be connected to an external plug or jack, the plurality of first terminals being electrically connected to the plurality of wires, respectively, through an interior of the first connector housing at said one end of the fixable flat cable; and a second connector housing attached to the rotating member, the second connector housing having a plurality of second terminals that are to be connected to another external plug or jack, the plurality of second terminals being respectively electrically connected to the plurality of wires, respectively, through an interior of the second connector housing at said another end of the fixable flat cable, wherein the first connector housing accommodates a plurality of electrically conductive paths that respectively connect the plurality of first terminals to the plurality of wires at said one end of the flexible flat cable, and at least one of the plurality of electrically conductive paths is configured to removably receive a protection device so as to protect the path from overcurrent, wherein said at least one of the plurality of electrically conductive paths in the first connector housing includes a protection device holder located inside the first connector housing to removably receive said protection device, wherein the first connector housing has a through-window at a position corresponding to the protection device holder so that the protection device can be inserted into the protection device holder located inside the first connector housing through the through-window from an exterior of the rotary connector apparatus and can be removed from the protection device holder through the through-window to the exterior of the rotary connector apparatus without disassembling the rotary connector apparatus, and wherein the protection device includes a cover member that covers the through-window when the protection device is inserted to the protection device holder.

2. The rotary connector apparatus according to claim 1, wherein the through-window is formed in a surface of the first connector housing that is in parallel to a direction of an axis of rotation of the rotating member.

3. The rotary connector apparatus according to claim 1, wherein said plurality of electrically conductive paths respectively include busbars that are integrally formed with the plurality of first terminals.

4. The rotary connector apparatus according to claim 3, wherein the busbar of said at least one of the plurality of electrically conductive paths includes a conductivity inspection portion to which a conductivity inspection device can be connected to test conductivity of the protection device, the conductivity inspection portion being disposed on a side of the protection device, when the protection device is installed, that is opposite to the terminal to which the corresponding electrically conductive path is connected.

5. The rotary connector apparatus according to claim 4, wherein the first connector housing has a conductivity inspection window at a position corresponding to the conductivity inspection portion so that the conductivity inspection device can be connected to the conductivity inspection portion through the conductivity inspection window from an exterior.

6. The rotary connector apparatus according to claim 1,
wherein said plurality of electrically conductive paths respectively include busbars that are integrally formed with the plurality of first terminals,
wherein the busbar of said at least one of the plurality of electrically conductive paths includes a conductivity inspection portion to which a conductivity inspection device can be connected to test conductivity of the protection device, the conductivity inspection portion being disposed on a side of the protection device, when the protection device is installed, that is opposite to the terminal to which the corresponding electrically conductive path is connected,
wherein the first connector housing has a conductivity inspection window at a position corresponding to the conductivity inspection portion so that the conductivity inspection device can be connected to the conductivity inspection portion through the conductivity inspection window from an exterior, and
wherein the through-window and the conductivity inspection window are continuously connected so as to have one integrated window.

7. The rotary connector apparatus according to claim 1, wherein the protection device is one of a resistor, a diode, and a fuse.

8. The rotary connector apparatus according to claim 1, wherein the protection device holder includes a pair of sockets to receive the protection device, and at least one of the pair of sockets have an elastic structure.

9. The rotary connector apparatus according to claim 1, wherein the first connector housing is provided in a surface or side face of the fixed member in such a manner as to avoid interference with rotation of the rotating member relative to the fixed member.

10. The rotary connector apparatus according to claim 1, wherein the second connector housing is provided in a surface or side face of the rotating member in such a manner as to avoid interference with rotation of the rotating member relative to the fixed member.

11. The rotary connector apparatus according to claim 1 wherein the first connector housing is a connector receptacle that is configured to receive an external connector plug.

12. The rotary connector apparatus according to claim 1 wherein the second connector housing is a connector receptacle that is configured to receive an external connector plug.

13. The rotary connector apparatus according to claim 1 wherein the first connector housing is a connector plug that is configured to be inserted into an external connector jack.

14. The rotary connector apparatus according to claim 1 wherein the second connector housing is a connector plug that is configured to be inserted into an external connector jack.

15. The rotary connector apparatus according to claim 1 wherein the first connector housing is integrally formed with the fixed member.

16. The rotary connector apparatus according to claim 1 wherein the second connector housing is integrally formed with the rotating member.

* * * * *